(12) United States Patent
Teruya et al.

(10) Patent No.: US 11,645,312 B2
(45) Date of Patent: May 9, 2023

(54) ATTRIBUTE EXTRACTION APPARATUS AND ATTRIBUTE EXTRACTION METHOD

(71) Applicant: HITACHI, LTD., Tokyo (JP)

(72) Inventors: Eri Teruya, Tokyo (JP); Kazuhide Aikoh, Tokyo (JP)

(73) Assignee: HITACHI, LTD., Tokyo (JP)

( * ) Notice: Subject to any disclaimer, the term of this patent is extended or adjusted under 35 U.S.C. 154(b) by 234 days.

(21) Appl. No.: 16/576,513

(22) Filed: Sep. 19, 2019

(65) Prior Publication Data

US 2020/0125592 A1 Apr. 23, 2020

(30) Foreign Application Priority Data

Oct. 18, 2018 (JP) .............................. JP2018-196380

(51) Int. Cl.
*G06F 16/31* (2019.01)
*G06V 30/414* (2022.01)
*G06V 30/416* (2022.01)

(52) U.S. Cl.
CPC .......... *G06F 16/313* (2019.01); *G06F 16/328* (2019.01); *G06V 30/414* (2022.01); *G06V 30/416* (2022.01)

(58) Field of Classification Search
CPC .... G06F 16/313; G06F 16/328; G06F 40/284; G06K 9/00463; G06K 9/00469
USPC .......................................................... 707/748
See application file for complete search history.

(56) References Cited

U.S. PATENT DOCUMENTS

| | | | | |
|---|---|---|---|---|
| 6,219,665 B1* | 4/2001 | Shiomi | ............... | G06F 16/3323 707/750 |
| 6,411,962 B1* | 6/2002 | Kupiec | ................. | G06F 16/313 |
| 6,622,139 B1* | 9/2003 | Nakayama | ............. | G06F 16/94 707/758 |
| 8,818,803 B2* | 8/2014 | Weber | .................... | G06F 16/739 704/231 |
| 9,460,195 B1* | 10/2016 | Zhang | ...................... | G06F 16/36 |
| 2005/0071365 A1* | 3/2005 | Hou | ....................... | G06F 16/313 707/E17.084 |

(Continued)

FOREIGN PATENT DOCUMENTS

JP 2011-204225 A 10/2011

*Primary Examiner* — Stephen S Hong
*Assistant Examiner* — Broderick C Anderson
(74) *Attorney, Agent, or Firm* — Volpe Koenig

(57) ABSTRACT

Among pieces of attribute information contained in a document, user-designated attribute information and other attribute information that may give additional value to the user-designated attribute information are accurately and efficiently presented. An attribute extraction apparatus includes a storage section that stores a document; and a computing section that executes a process for calculating a predetermined index on the basis of the document's structure with respect to a relationship between a plurality of pieces of attribute information described in the document, and a process for calculating an importance degree of each piece of the attribute information other than predetermined attribute information for the predetermined attribute information on the basis of at least one of the index and a predetermined statistical property with respect to a relationship between the predetermined attribute information and the attribute information other than the predetermined attribute information among the plurality of pieces of the attribute information.

9 Claims, 22 Drawing Sheets

(56) References Cited

U.S. PATENT DOCUMENTS

| | | | |
|---|---|---|---|
| 2008/0071782 A1* | 3/2008 | Yoshimura | G06F 16/36 |
| 2012/0221580 A1* | 8/2012 | Barney | G06F 16/2465 |
| | | | 707/748 |
| 2018/0082183 A1* | 3/2018 | Hertz | G06N 5/00 |
| 2020/0034367 A1* | 1/2020 | Iwasaki | G06N 20/00 |

* cited by examiner

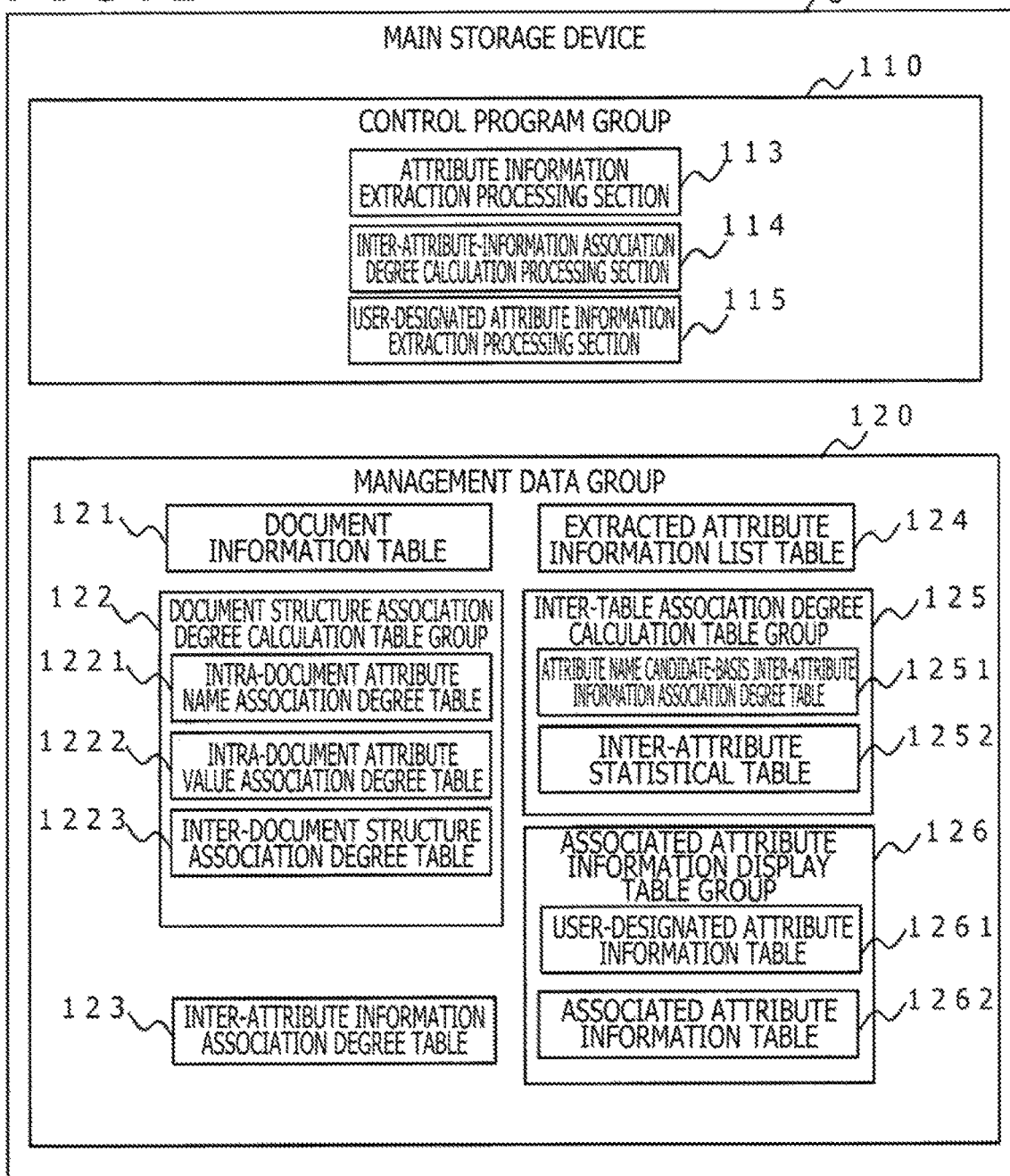

FIG.4

EXTRACTED ATTRIBUTE INFORMATION LIST TABLE 124

| ATTRIBUTE INFORMATION ID 1241 | ATTRIBUTE NAME 1242 | ATTRIBUTE VALUE 1243 | DOCUMENT ID 1244 | SECTION NAME 1245 | EXTRACTION LOCATION LABEL 1246 | ATTRIBUTE INFORMATION IMPORTANCE DEGREE 1247 |
|---|---|---|---|---|---|---|
| 1 | Material | Mate-A | 1 | Abstract | 60 | 0.98 |
| 2 | Chemical amount | 10 mol | 1 | Abstract | 80 | 0.20 |
| 3 | Melting point | 500 K | 1 | Experiment | 159 | 0.43 |
| 4 | Pressure | 1000 hPa | 1 | Experiment | 168 | 0.43 |
| 5 | Boiling point | 800 K | 1 | Experiment | 201 | 0.66 |
| 6 | Pressure | 1000 hPa | 1 | Experiment | 211 | 0.50 |
| 7 | Electrical resistivity | 20 nΩm | 1 | Experiment | 680 | 0.38 |
| ... | ... | ... | ... | ... | ... | ... |

FIG.5

INTRA DOCUMENT ATTRIBUTE NAME ASSOCIATION DEGREE TABLE 1221

| ATTRIBUTE INFORMATION ID 12211 | ATTRIBUTE NAME 12212 | ATTRIBUTE INFORMATION CANDIDATE ID 12213 | ATTRIBUTE NAME CANDIDATE 12214 | INTRA-DOCUMENT ATTRIBUTE NAME ASSOCIATION DEGREE 12215 |
|---|---|---|---|---|
| 1 | Material | 1 | Material | 1.00 |
| 1 | Material | 2 | Chemical amount | 0.80 |
| 1 | Material | 3 | Melting Point | 0.98 |
| 1 | Material | 4 | Pressure | 0.51 |
| ... | ... | ... | ... | ... |
| 3 | Melting Point | 1 | Material | 0.89 |
| 3 | Melting point | 2 | Chemical amount | 0.20 |
| 3 | Melting Point | 3 | Melting Point | 1.00 |
| 3 | Melting Point | 4 | Pressure | 0.90 |
| ... | ... | ... | ... | ... |

FIG.6

INTRA-DOCUMENT ATTRIBUTE VALUE ASSOCIATION DEGREE TABLE 1222

| ATTRIBUTE INFORMATION ID 12221 | ATTRIBUTE VALUE 12222 | ATTRIBUTE INFORMATION CANDIDATE ID 12223 | ATTRIBUTE VALUE CANDIDATE 12224 | INTRA-DOCUMENT ATTRIBUTE VALUE ASSOCIATION DEGREE 12225 |
|---|---|---|---|---|
| 1 | Mate-A | 1 | Mate-A | 1.0 |
| 1 | Mate-A | 2 | 10 mol | 0.91 |
| 1 | Mate-A | 3 | 500 K | 0.51 |
| 1 | Mate-A | 4 | 1000 hPa | 0.42 |
| ... | ... | ... | ... | ... |
| 3 | 500 K | 1 | Mate-A | 0.51 |
| 3 | 500 K | 2 | 10 mol | 0.21 |
| 3 | 500 K | 3 | 500 K | 1.0 |
| 3 | 500 K | 4 | 1000 hPa | 0.81 |
| ... | ... | ... | ... | ... |

FIG. 7

INTER-DOCUMENT-STRUCTURE ASSOCIATION DEGREE TABLE 1223

| ATTRIBUTE INFORMATION ID 12231 | ATTRIBUTE NAME 12232 | ATTRIBUTE VALUE 12233 | ATTRIBUTE INFORMATION CANDIDATE ID 12234 | ATTRIBUTE NAME CANDIDATE 12235 | ATTRIBUTE VALUE CANDIDATE 12236 | INTRA-DOCUMENT ASSOCIATION DEGREE 12237 | INTER-ATTRIBUTE-INFORMATION ASSOCIATION DEGREE 12238 |
|---|---|---|---|---|---|---|---|
| 1 | Material | Mate-A | 1 | Material | Mate-A | 1.00 | 1.00 |
| 1 | Material | Mate-A | 2 | Chemical amount | 10 mol | 0.82 | 0.81 |
| 1 | Material | Mate-A | 3 | Melting Point | 500 K | 0.85 | 0.92 |
| 1 | Material | Mate-A | 4 | Pressure | 1000 hPa | 0.61 | 0.51 |
| ... | ... | ... | ... | ... | ... | ... | ... |
| 3 | Melting Point | 500 K | 1 | Material | Mate-A | 0.71 | 0.91 |
| 3 | Melting point | 500 K | 2 | Chemical amount | 10 mol | 0.20 | 0.10 |
| 3 | Melting Point | 500 K | 3 | Melting Point | 500 K | 1.00 | 1.00 |
| 3 | Melting Point | 500 K | 4 | Pressure | 1000 hPa | 0.85 | 0.82 |
| ... | ... | ... | ... | ... | ... | ... | ... |

FIG. 8A
ATTRIBUTE-NAME-CANDIDATE-BASIS INTER-ATTRIBUTE-INFORMATION ASSOCIATION DEGREE TABLE 1251

| ATTRIBUTE INFORMATION ID 12511 | ATTRIBUTE NAME 12512 | ATTRIBUTE VALUE 12513 | ATTRIBUTE INFORMATION CANDIDATE ID 12514 | ATTRIBUTE NAME CANDIDATE 12515 | ATTRIBUTE VALUE CANDIDATE 12516 | INTRA-DOCUMENT ASSOCIATION DEGREE 12517 |
|---|---|---|---|---|---|---|
| 3 | Melting point | 500 K | 1 | Material | Mate-A | 0.85 |
| 64 | Melting point | 600 K | 32 | Material | Mate-B | 0.92 |
| 825 | Melting point | 800 K | 264 | Material | Mate-C | 0.82 |
| 2625 | Melting point | 120 K | 2510 | Material | Mate-D | 0.79 |
| 2824 | Melting point | 70 K | 2801 | Material | Mate-E | 0.96 |
| ... | ... | ... | ... | ... | ... | ... |

FIG. 8B
ATTRIBUTE-NAME-CANDIDATE-BASIS INTER-ATTRIBUTE-INFORMATION ASSOCIATION DEGREE TABLE 1251

| ATTRIBUTE INFORMATION ID 12511 | ATTRIBUTE NAME 12512 | ATTRIBUTE VALUE 12513 | ATTRIBUTE INFORMATION CANDIDATE ID 12514 | ATTRIBUTE NAME CANDIDATE 12515 | ATTRIBUTE VALUE CANDIDATE 12516 | INTRA-DOCUMENT ASSOCIATION DEGREE 12517 |
|---|---|---|---|---|---|---|
| 3 | Melting point | 500 K | 516 | Chemical amount | 10 mol | 0.25 |
| 64 | Melting point | 600 K | — | — | — | — |
| 825 | Melting point | 800 K | 1483 | Chemical amount | 10 mol | 0.62 |
| 2625 | Melting point | 120 K | 3551 | Chemical amount | 10 mol | 0.41 |
| 2824 | Melting point | 70 K | 6841 | Chemical amount | 10 mol | 0.28 |
| ... | ... | ... | ... | ... | ... | ... |

FIG.8C ATTRIBUTE-NAME-CANDIDATE-BASIS INTER-ATTRIBUTE-INFORMATION ASSOCIATION DEGREE TABLE

| ATTRIBUTE INFORMATION ID | ATTRIBUTE NAME | ATTRIBUTE VALUE | ATTRIBUTE INFORMATION CANDIDATE ID | ATTRIBUTE NAME CANDIDATE | ATTRIBUTE VALUE CANDIDATE | INTRA-DOCUMENT ASSOCIATION DEGREE |
|---|---|---|---|---|---|---|
| 3 | Melting point | 500 K | 26 | Pressure | 1000 hPa | 0.95 |
| 64 | Melting point | 600 K | 305 | Pressure | 1013 hPa | 0.64 |
| 825 | Melting point | 800 K | 2045 | Pressure | 1000 hPa | 0.81 |
| 2625 | Melting point | 120 K | 3611 | Pressure | 1500 hPa | 0.76 |
| 2824 | Melting point | 70 K | 5526 | Pressure | 2000 hPa | 0.85 |
| ... | ... | ... | ... | ... | ... | ... |

FIG.8D ATTRIBUTE-NAME-CANDIDATE-BASIS INTER-ATTRIBUTE-INFORMATION ASSOCIATION DEGREE TABLE

| ATTRIBUTE INFORMATION ID | ATTRIBUTE NAME | ATTRIBUTE VALUE | ATTRIBUTE INFORMATION CANDIDATE ID | ATTRIBUTE NAME CANDIDATE | ATTRIBUTE VALUE CANDIDATE | INTRA-DOCUMENT ASSOCIATION DEGREE |
|---|---|---|---|---|---|---|
| 3 | Melting point | 500 K | 52 | Boiling point | 2000 K | 0.58 |
| 64 | Melting point | 600 K | — | — | — | — |
| 825 | Melting point | 800 K | 235 | Boiling point | 1000 K | 0.20 |
| 2625 | Melting point | 120 K | 4567 | Boiling point | 130 K | 0.76 |
| 2824 | Melting point | 70 K | — | — | — | — |
| ... | ... | ... | ... | ... | ... | ... |

INTER-ATTRIBUTE STATISTICAL TABLE 1252

| ATTRIBUTE NAME 12521 | ATTRIBUTE NAME CANDIDATE 12522 | ATTRIBUTE VALUE COUNT INDEX 12523 | DISPERSION INDEX 12524 | AVERAGE-INTER-WORD ASSOCIATION DEGREE INDEX 12525 | OVERALL STATISTICAL INDEX 12526 |
|---|---|---|---|---|---|
| Melting point | Material | 0.98 | 0.88 | 0.90 | 0.92 |
| Melting point | Chemical amount | 0.21 | 0.65 | 0.20 | 0.21 |
| Melting point | Pressure | 0.65 | 0.71 | 0.81 | 0.87 |
| Melting point | Boiling point | 0.31 | 0.71 | 0.21 | 0.32 |

ASSOCIATED ATTRIBUTE INFORMATION EXTRACTION FLOW

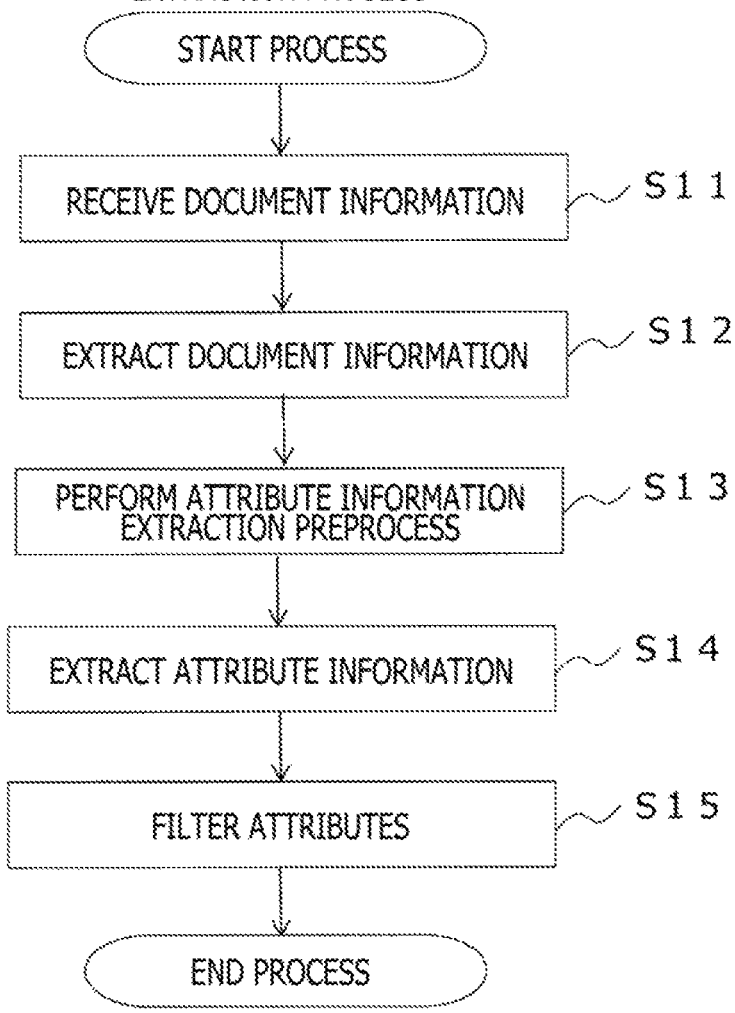

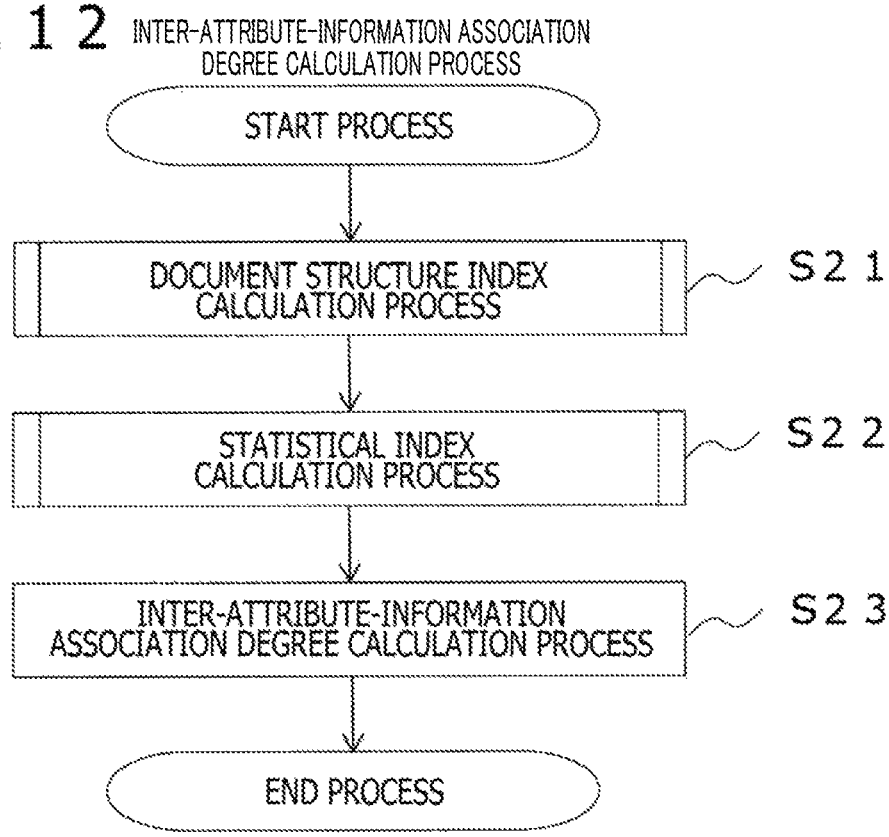

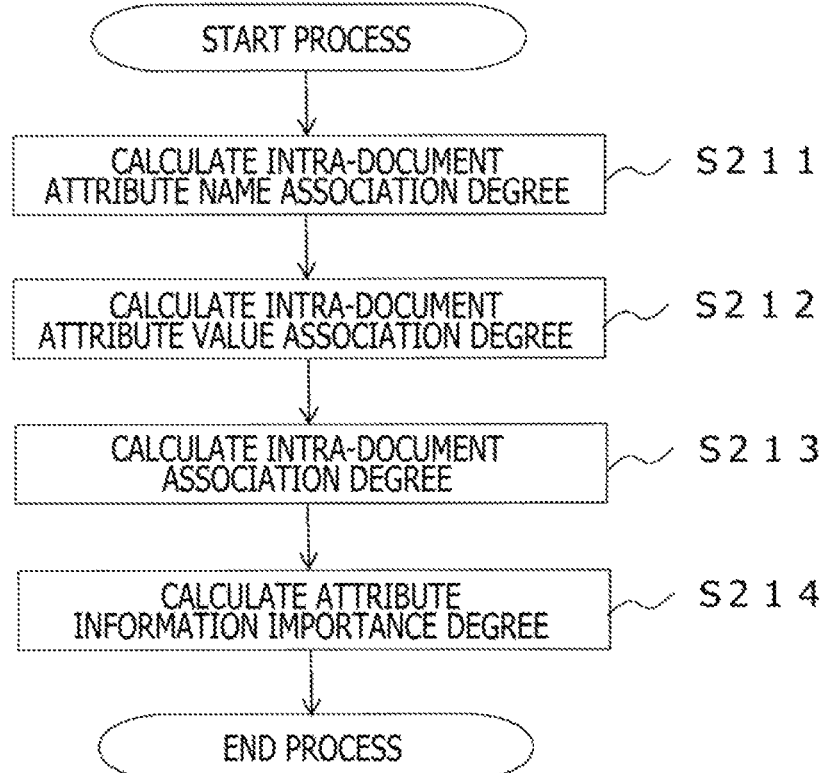

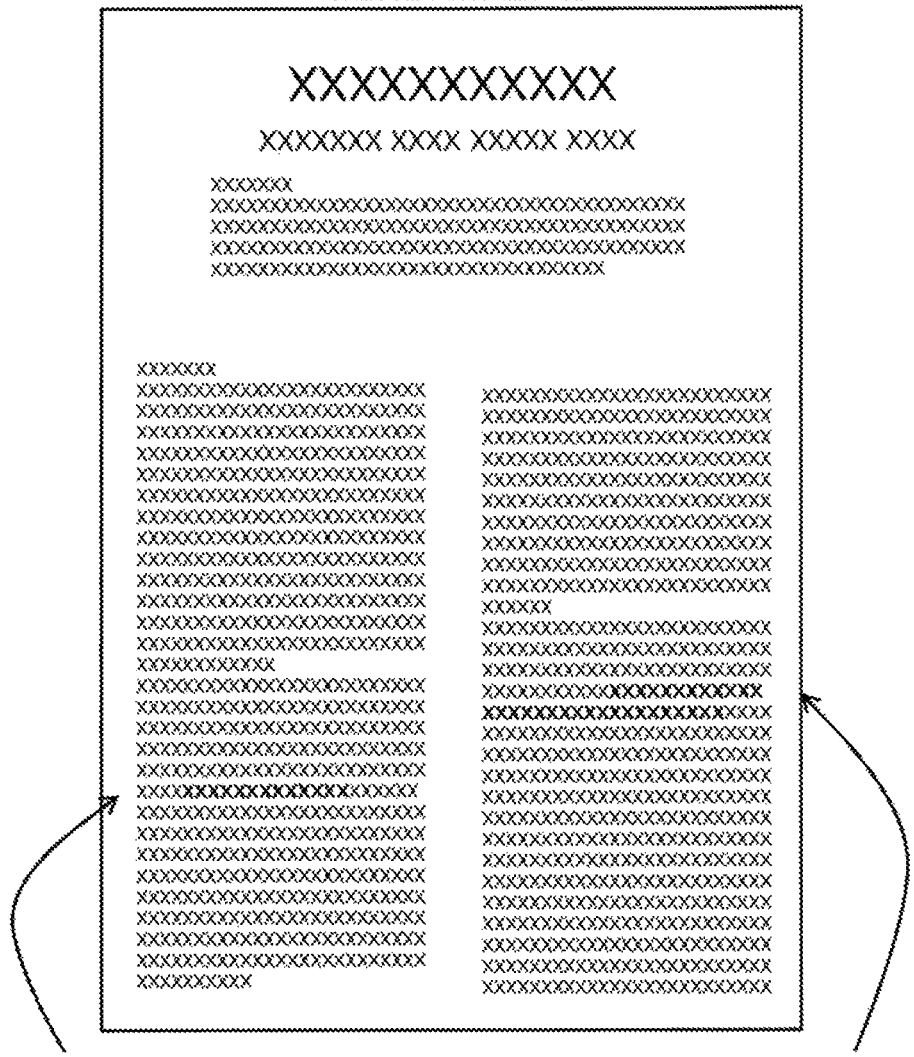
FIG.14 DOCUMENT STRUCTURE INDEX CALCULATION METHOD
... The melting point of the Mate-A under the pressure of 1000 hPa is 500 K . ...
... The measured melting point of the Mate-B is 500 K when the pressure is 1000 hPa. ...

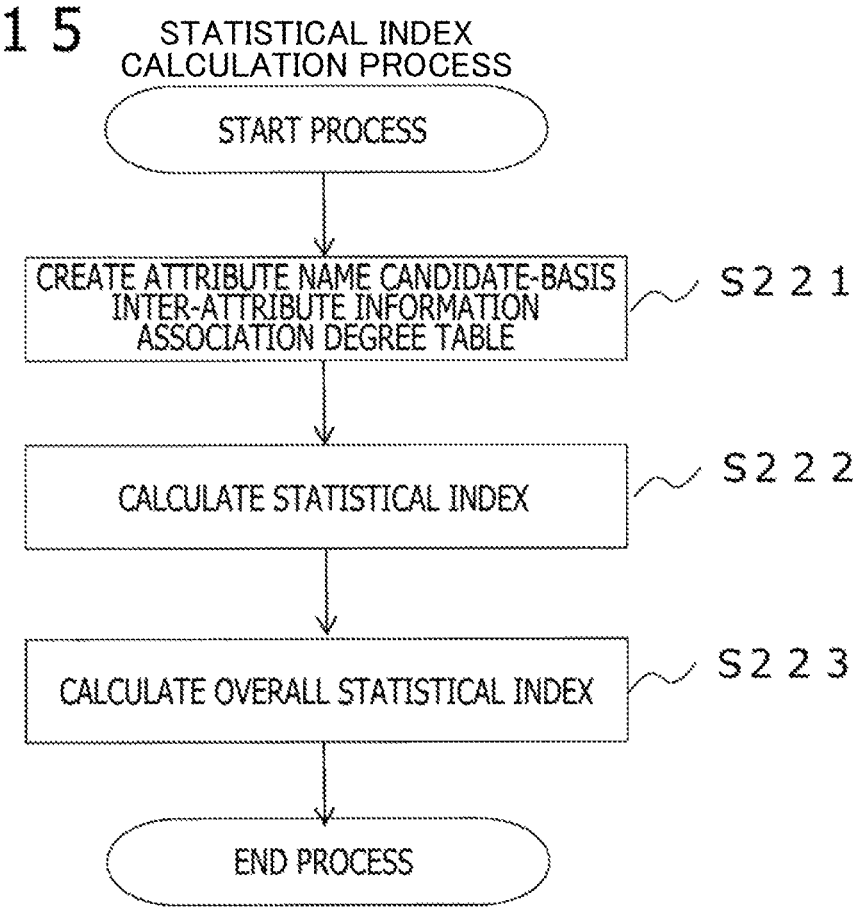

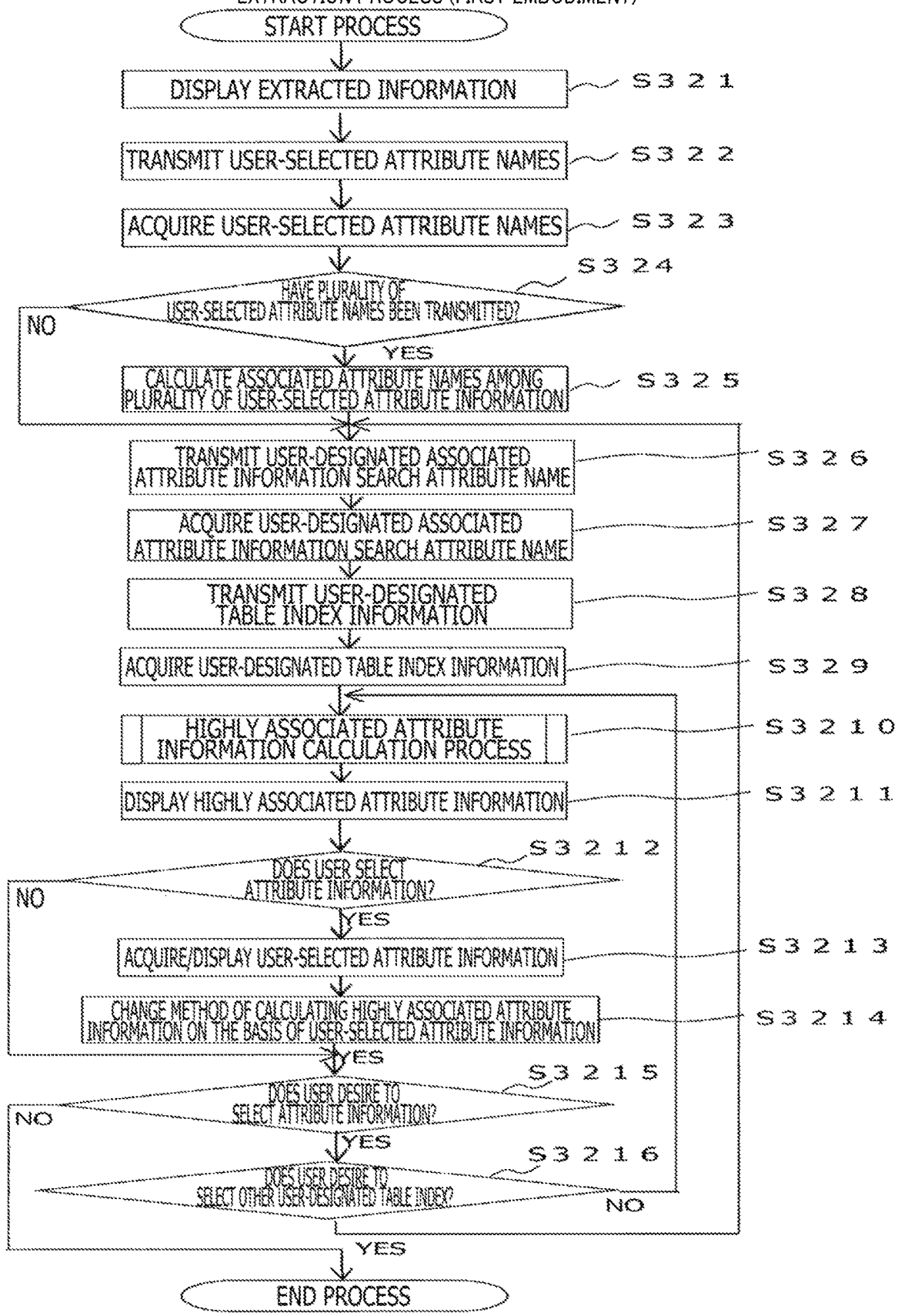

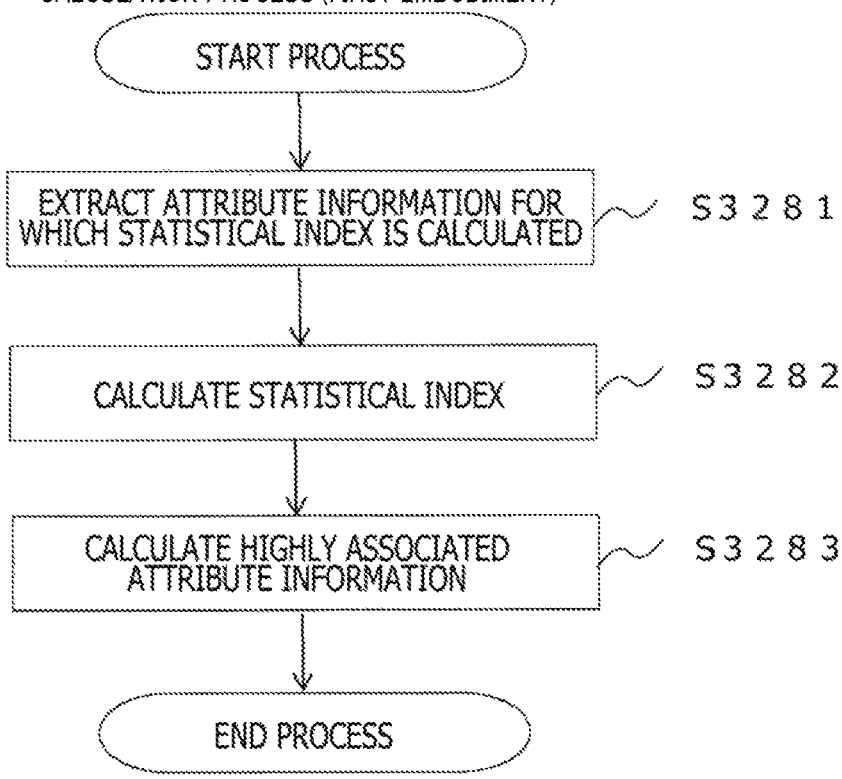
FIG. 17 HIGHLY ASSOCIATED ATTRIBUTE INFORMATION CALCULATION PROCESS (FIRST EMBODIMENT)
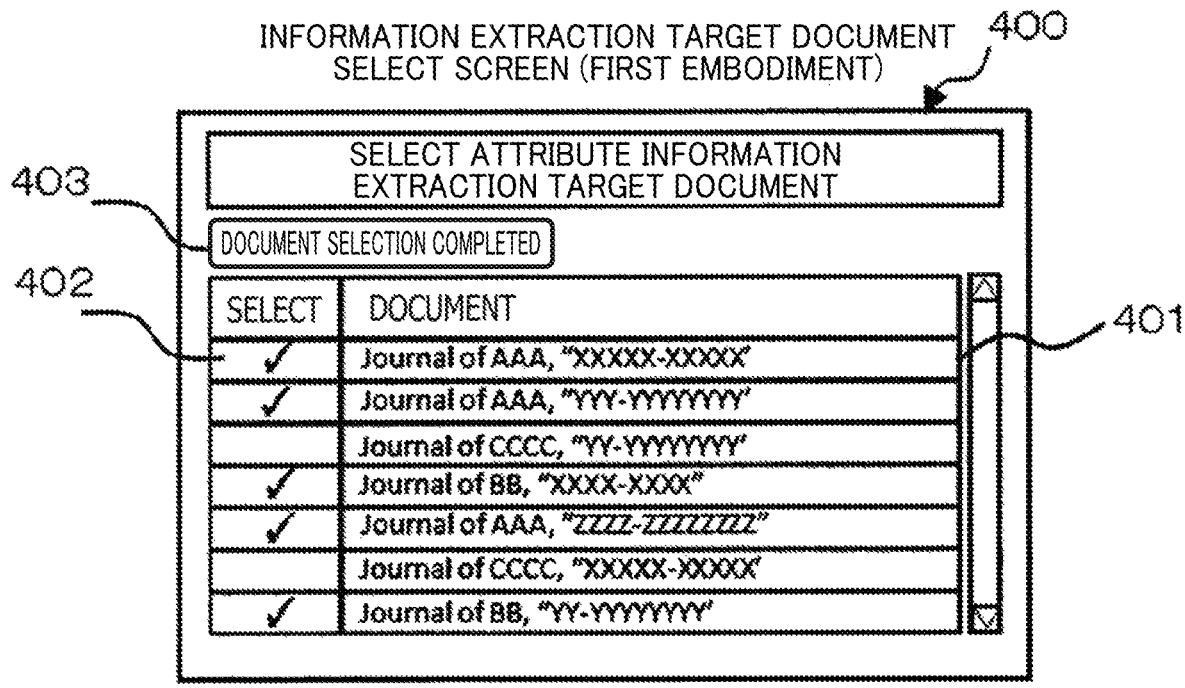
FIG. 18

FIG.19

ATTRIBUTE INFORMATION SEARCH SCREEN (FIRST EMBODIMENT) 600

DESIGNATE ATTRIBUTE INFORMATION 601

EXTRACTED ATTRIBUTE LIST

| Material | Molar mass | Pressure | Boiling point | Catalyst | Melting point |
|---|---|---|---|---|---|
| Mate-C | 2 g/mol | 1000 hPa | 1200 K | Cu(OTf)₃ | 500 K |
| Mate-A | 61 g/mol | 1500 hPa | 1200 K | Cu₂O | 2500 K |
| Mate-D | 5 g/mol | 900 hPa | 500 K | MnO₃ | 25 K |

SELECTED ATTRIBUTE NAME: Material, Melting point  602

ASSOCIATED ATTRIBUTE SEARCH ATTRIBUTE: Melting point  603

☐ DISPERSION ☐ ATTRIBUTE COUNT ☑ AVERAGE ASSOCIATION DEGREE ☐ CORRELATION  604

SEARCH  605

DISPLAYED ATTRIBUTE INFORMATION | ASSOCIATED ATTRIBUTE INFORMATION  607

| Material | Melting point | Pressure | Electric current | Magnetic field | Chemical amount |
|---|---|---|---|---|---|
| Mate-A | 500 K | 1000 hPa | 100 A | – | 10 mol |
| Mate-B | 600 K | 1500 hPa | 500 A | – | 200 mol |
| Mate-C | 800 K | 500 hPa | – | – | 1 mol |
| Mate-D | 120 K | 2000 hPa | – | 1.0 A/m | 100 mol |
| Mate-E | 70 K | 1000 hPa | 1000 A | – | 1 mol |
| ... | ... | ... | ... | ... | ... |

606

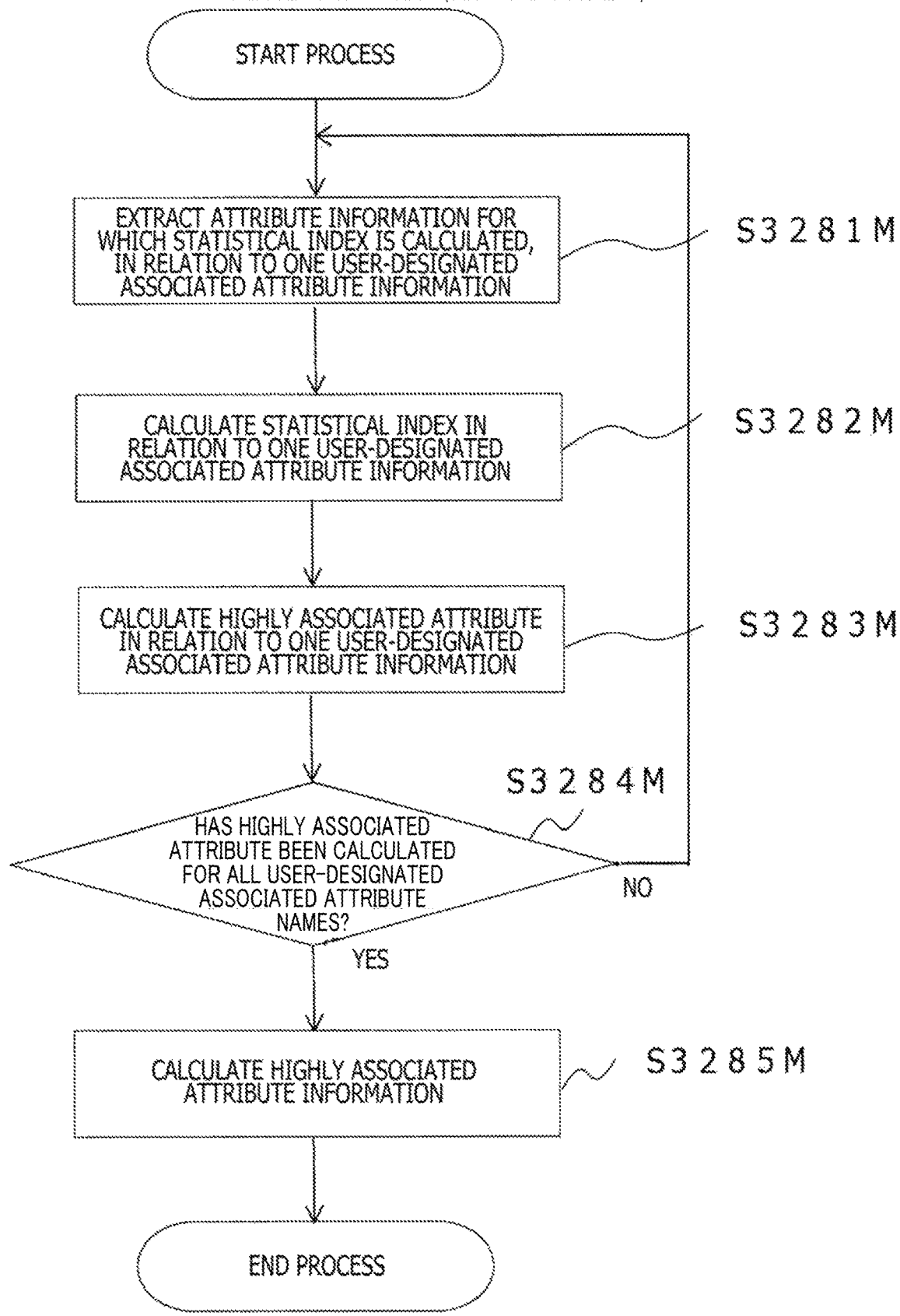
FIG. 20 HIGHLY ASSOCIATED ATTRIBUTE INFORMATION CALCULATION PROCESS (SECOND EMBODIMENT)

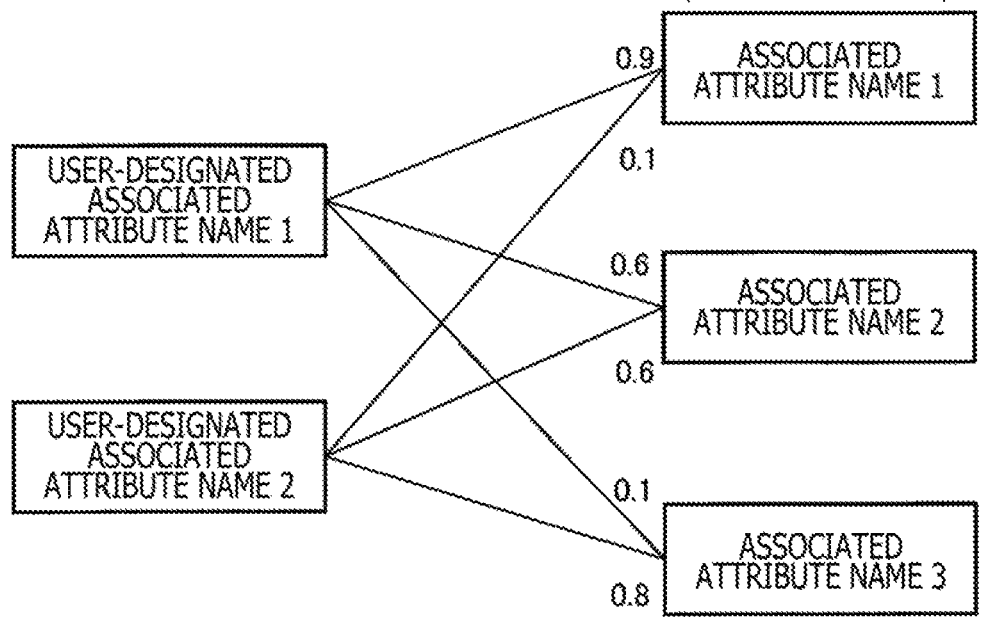
FIG.21 EXAMPLE OF HIGHLY ASSOCIATED ATTRIBUTE INFORMATION CALCULATION PROCESS (SECOND EMBODIMENT)

FIG. 22

USER-DESIGNATED ATTRIBUTE INFORMATION TABLE 1261

| ATTRIBUTE INFORMATION ID 12611 | ATTRIBUTE NAME 12612 | ATTRIBUTE VALUE 12613 | DOCUMENT ID 12614 | DOCUMENT NAME 12615 | EXTRACTION LOCATION LABEL 12616 | DOCUMENT DATA 12616 |
|---|---|---|---|---|---|---|
| 1 | Material | Mate-A | 1 | Journal of AAA, "XXXXX" xxxxx | 60 | A characteristic feature of the Mate-A is theoretically studied .... |
| 121 | Material | Mate-A | 26 | Journal of AAA, "XXXXX" xxxxx | 3 | We synthesized the Mate-A to study the YYYY dependency of the ... |
| 6851 | Material | Mate-A | 69 | Journal of AAA, "XXXXX" xxxxx | 20 | The liquefied Mate-A shows the ZZZ feature, which is the ... |

FIG. 23

ASSOCIATED ATTRIBUTE INFORMATION TABLE

| ATTRIBUTE INFORMATION ID | ATTRIBUTE NAME | ATTRIBUTE VALUE | ATTRIBUTE INFORMATION CANDIDATE ID | ATTRIBUTE NAME CANDIDATE | ATTRIBUTE VALUE CANDIDATE | INTER-ATTRIBUTE INFORMATION ASSOCIATION DEGREE | DOCUMENT ID | DOCUMENT NAME | EXTRACTION LOCATION LABEL | DOCUMENT DATA |
|---|---|---|---|---|---|---|---|---|---|---|
| 1 | Material | Mate-A | 2 | Chemical amount | 10 mol | 0.91 | 1 | Journal of AAA, "xxxxx: xxxx" | 80 | A characteristic feature of the Mate-A is ... |
| 1 | Material | Mate-A | 3 | Melting point | 500 K | 0.84 | 1 | Journal of AAA, "xxxxx: xxxx" | 159 | The melting point of the Mate-A is 500 K ... |
| 1 | Material | Mate-A | 3 | Boiling point | 800 K | 0.83 | 2 | Journal of AAA, "xxxxx: xxxx" | 301 | The measured boiling point of the Mate-A is 800 ... |
| 1 | Material | Mate-A | 12 | density | 19 g/mol³ | 0.81 | 1 | Journal of AAA, "xxxxx: xxxx" | 699 | The density of the Mate-A is ... |
| ... | ... | ... | ... | ... | ... | ... | ... | ... | ... | ... |
| 3 | Melting point | 500 K | 4 | Pressure | 1000 kPa | 0.82 | 3 | Journal of AAA, "xxxxx: xxxx" | 168 | The melting point of the Mate-A is 500 K ... |
| 5 | Boiling point | 800 K | 8 | Pressure | 1000 kPa | 0.81 | 2 | Journal of AAA, "xxxxx: xxxx" | 311 | The measured boiling point of the Mate-A is 800 K ... |
| ... | ... | ... | ... | ... | ... | ... | ... | ... | ... | ... |

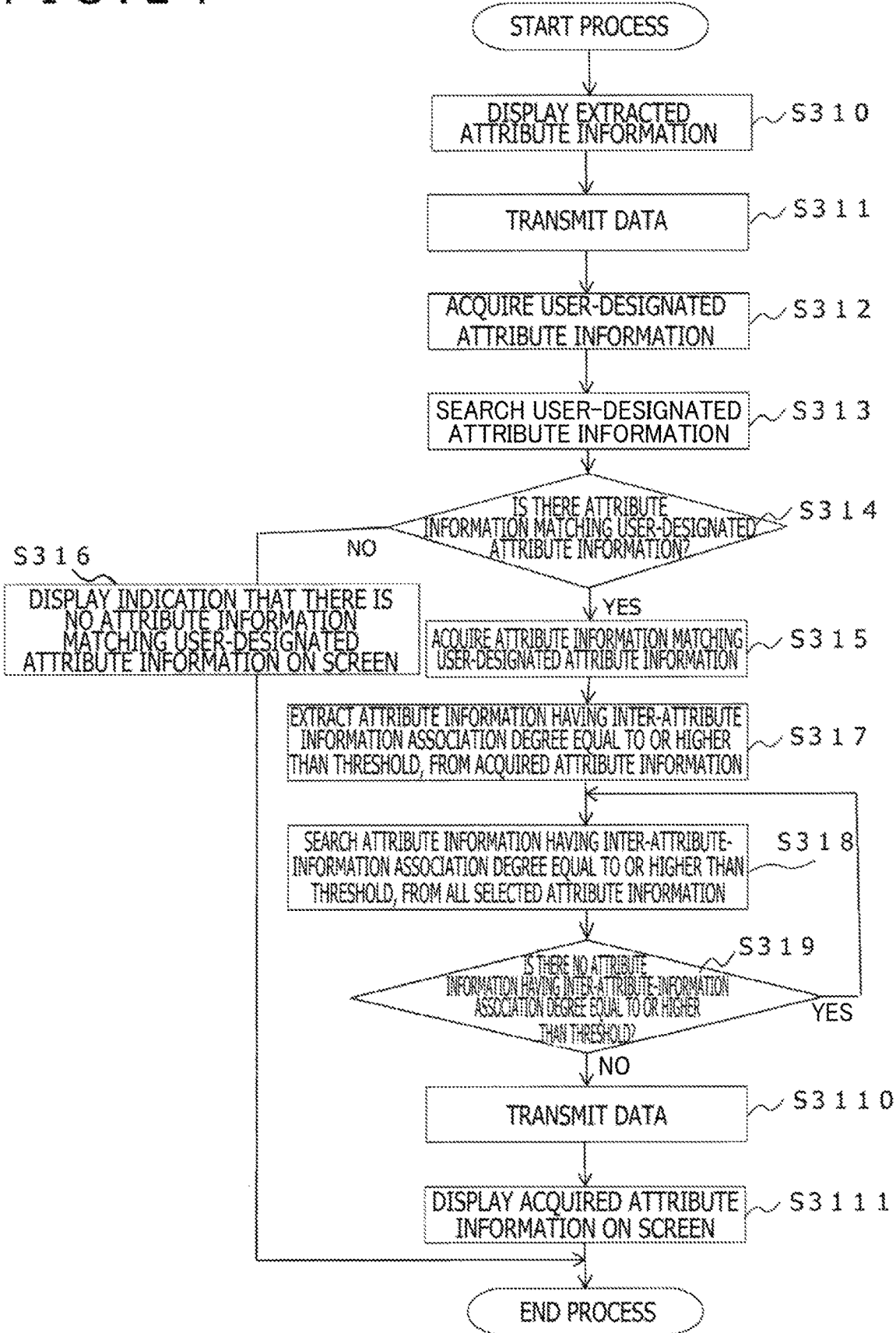
FIG. 24  USER-DESIGNATED ATTRIBUTE INFORMATION EXTRACTION PROCESS (THIRD EMBODIMENT)

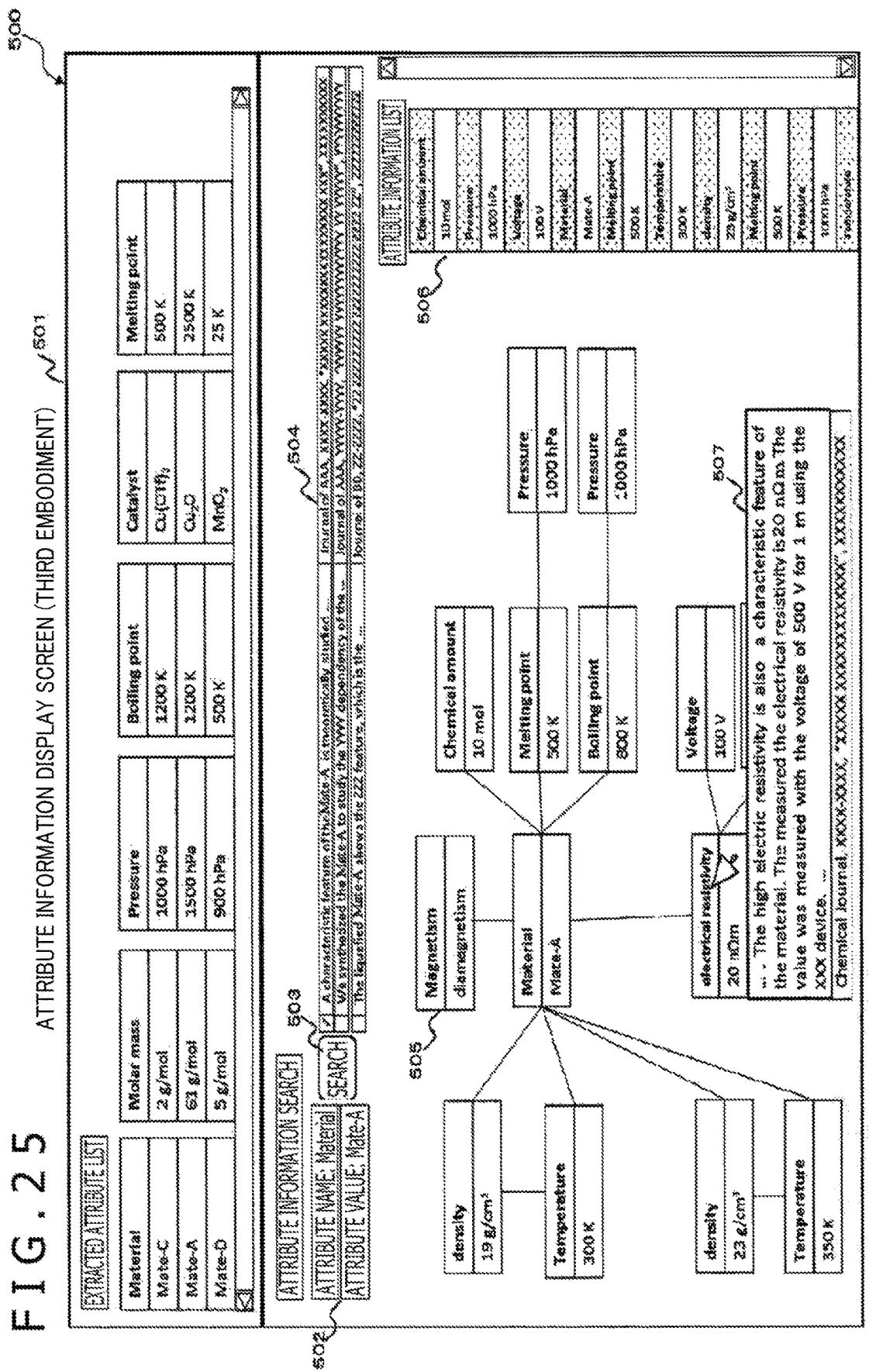

ATTRIBUTE EXTRACTION APPARATUS AND ATTRIBUTE EXTRACTION METHOD

CROSS-REFERENCE TO RELATED APPLICATION

This application claims priority pursuant to 35 U.S.C. § 119 from Japanese Patent Application No. 2018-196380, filed on Oct. 18, 2018, the entire disclosure of which is incorporated herein by reference.

BACKGROUND

Technical Field

The present invention relates to an attribute extraction apparatus and an attribute extraction method.

Related Art

A technique called information extraction for extracting only useful information from a document with a view to effective use of information obtained from the document is making progress.

An example of the information extraction and a method of making effective use of the information extraction are as follows. For example, in a manufacturing scene or the like, there is a technique for automatically extracting information about a situation, a cause, coping, and the like of a failure of a manufacturing machine from a failure report related to the manufacturing machine, performing analysis, evaluation, and the like of a failure occurrence tendency on the basis of the extracted data, and attempting early coping with the failure, optimization of the coping, or the like.

It is noted that the failure report is a report in which the situation, the cause, the coping, and the like for the manufacturing machine are described in a natural language.

As another example, there is an attempt to extract data such as physical property values associated with a chemical material discussed in each chemical paper from an enormous amount of chemical papers and to use the data as descriptors in Materials Informatics.

Materials Informatics means an effort to efficiently search a new material having a desired function by using existing experimental data or the like.

An example of extracting data for use in Materials Informatics is as follows. A situation, for example, can be supposed in which attribute names and attribute values such as "attribute name: material name, attribute value: Material-A," "attribute name: Melting point, attribute value: 500K," and "attribute name: Boiling point, attribute value: 800K" are extracted from a paper in which a content associated with a material named "Material-A" is discussed, as information associated with this "Material-A."

It is noted herein that a set of the attribute name and the attribute value described above will be referred to as "attribute information" and the attribute information is used in subsequent description.

In extracting data as described above, it is desired that information associated with chemical materials described in each paper can be extracted comprehensively and automatically without user's defining all attribute names to be extracted in advance.

Such a need derives from difficulty in comprehensively defining attribute names from the very beginning since a viewpoint of discussion related to chemical materials varies among papers and description of attribute names are multi-faceted.

To meet the need, there is proposed, as a method of extracting attribute names without user's defining all the attribute names in advance, an attribute extraction apparatus, refer to JP-2011-204225-A, characterized by including: query preparation means that prepares a query matching one or more of syntaxes on the basis of an attribute correlation knowledge database, from one input instance and at least one of input seed attributes; text retrieval means that retrieves unstructured text in an unstructured text database using the query; and text collation means that extracts another attribute of the instance by executing text collation to the retrieved text in accordance with the syntax, or the like.

In the conventional technique, however, only words according to an attribute extraction rule are extracted as attribute names and association between the extracted attribute names remains unclear.

It is assumed, for example, a certain paper contains a sentence "The Melting point of the Material-A under the Pressure of 1000 hPa is 500K."

It is also assumed that this sentence is applied to the conventional technique and processed, and that attribute information such as "attribute name: Melting point, attribute value: 500K" and "attribute name: Pressure, attribute value: 1000 hPa" is extracted.

In a case of referring to this extraction result, a person can estimate that there is the association between the two pieces of attribute information, that is, "attribute name: Melting point, attribute value: 500K" and "attribute name: Pressure, attribute value: 1000 hPa." However, as already described, only the two pieces of attribute information are independently extracted and it is unclear that the two pieces of attribute information are associated. Furthermore, in a case in which an object from which attribute information is to be extracted is a large amount of papers, an enormous number of pieces of attribute information other than the two pieces of attribute information are eventually extracted.

In a case in which thinking of discovering material candidates for which "Melting point" is equal to or higher than "500K" by Materials informatics under such a circumstance, a user selects "Melting point" as a descriptor in Materials Informatics.

In this case, according to the conventional technique, information associated with the descriptor is enumerated and input information to an AI in Materials Informatics is generated. Furthermore, in this case, it is preferable to also use "Pressure" associated with "Melting point" as a descriptor.

However, in a case in which the user is unaware of the presence of "Pressure" as an attribute name associated with "Melting point," the association between "Melting point" and "Pressure" is not indicated in the conventional technique. Owing to this, it is difficult to add "Pressure" as a descriptor.

Provided that "Pressure" can be added as a descriptor, an enormous amount of pieces of attribute information are extracted. Therefore, the user tends to take long time to discover "Pressure" as the descriptor for use in Materials Informatics.

SUMMARY OF THE INVENTION

An object of the present invention is, therefore, to provide a technique for accurately and efficiently presenting user-designated attribute information and other attribute information that may give additional value to the user-designated attribute information among attribute information contained in a document.

To accomplish the object, an attribute extraction apparatus according to the present invention includes: a storage section that stores a document; and a computing section that executes a process for calculating a predetermined index on a basis of a document structure of the document with respect to a relationship between a plurality of pieces of attribute information described in the document, and a process for calculating an importance degree of each piece of the attribute information other than predetermined attribute information for the predetermined attribute information on a basis of at least one of the index and a predetermined statistical property with respect to a relationship between the predetermined attribute information and the attribute information other than the predetermined attribute information among the plurality of pieces of the attribute information.

Furthermore, an attribute extraction method according to the present invention includes: by an information processing apparatus including a storage section storing a document, executing a process for calculating a predetermined index on a basis of a document structure of the document with respect to a relationship between a plurality of pieces of attribute information described in the document; and by the information processing apparatus, executing a process for calculating an importance degree of each piece of the attribute information other than predetermined attribute information for the predetermined attribute information on a basis of at least one of the index and a predetermined statistical property with respect to a relationship between the predetermined attribute information and the attribute information other than the predetermined attribute information among the plurality of pieces of the attribute information.

Moreover, an attribute information extraction program according to the present invention, including: by an information processing apparatus having a storage section storing a document, executing a process for calculating a predetermined index on the basis of a document structure of the document with respect to a relationship between a plurality of pieces of attribute information described in the document; and by the information processing apparatus, executing a process for calculating an importance degree of each piece of the attribute information other than predetermined attribute information for the predetermined attribute information on a basis of at least one of the index and a predetermined statistical property with respect to a relationship between the predetermined attribute information and the attribute information other than the predetermined attribute information among the plurality of pieces of the attribute information.

According to the present invention, it is possible to accurately and efficiently present user-designated attribute information and other attribute information that may give additional value to the user-designated attribute information among attribute information contained in a document.

BRIEF DESCRIPTION OF THE DRAWINGS

FIG. 2 depicts an example of a configuration of a data management server in the first embodiment;

FIG. 3 depicts an example of a document information table in the first embodiment;

FIG. 4 depicts an example of an extracted attribute information list table in the first embodiment;

FIG. 5 depicts an example of an intra-document attribute name association degree table in the first embodiment;

FIG. 6 depicts an example of an intra-document attribute value association degree table in the first embodiment;

FIG. 7 depicts an example of a document structure association degree table in the first embodiment;

FIGS. 8A to 8D each depicts an example of attribute-name-candidate-basis inter-attribute-information association degree tables in the first embodiment;

FIG. 11 is a flowchart diagram of an attribute information extraction process in the first embodiment;

FIG. 12 is a flowchart diagram of an inter-attribute-information association degree calculation process in the first embodiment;

FIG. 13 is a flowchart diagram of a document structure index calculation process in the first embodiment;

FIG. 14 depicts an example of a document structure index calculation method in the first embodiment;

FIG. 15 is a flowchart diagram of a statistical index calculation process in the first embodiment;

FIG. 16 is a flowchart diagram of a user-designated attribute information extraction process in the first embodiment;

FIG. 17 depicts a highly associated attribute information calculation process in the first embodiment;

FIG. 18 depicts an example of an information extraction target document select screen in the first embodiment;

FIG. 19 depicts an attribute information search screen in the first embodiment;

FIG. 20 is a flowchart diagram of a highly associated attribute information calculation process in a second embodiment;

FIG. 21 depicts an example of a highly associated attribute information calculation method in the second embodiment;

FIG. 22 depicts an example of a user-designated attribute information table in a third embodiment;

FIG. 23 depicts an example of an associated attribute information table in the third embodiment;

FIG. 24 is a flowchart diagram of a user-designated attribute information extraction process in the third embodiment; and FIG. 25 depicts an attribute information display screen in the third embodiment.

DETAILED DESCRIPTION OF THE EMBODIMENTS

First Embodiment

In a first embodiment, a situation is supposed in which an attribute extraction apparatus presents attribute information useful for analysis to a user at a time of user's selecting a descriptor for use in Materials Informatics. It is noted that the descriptor is selected from among attribute information extracted from, for example, a chemical paper. An overall configuration including the attribute extraction apparatus coping with such a situation will be described hereinafter.
<Outline of Overall Configuration Including Attribute Extraction Apparatus>

Figure 1:
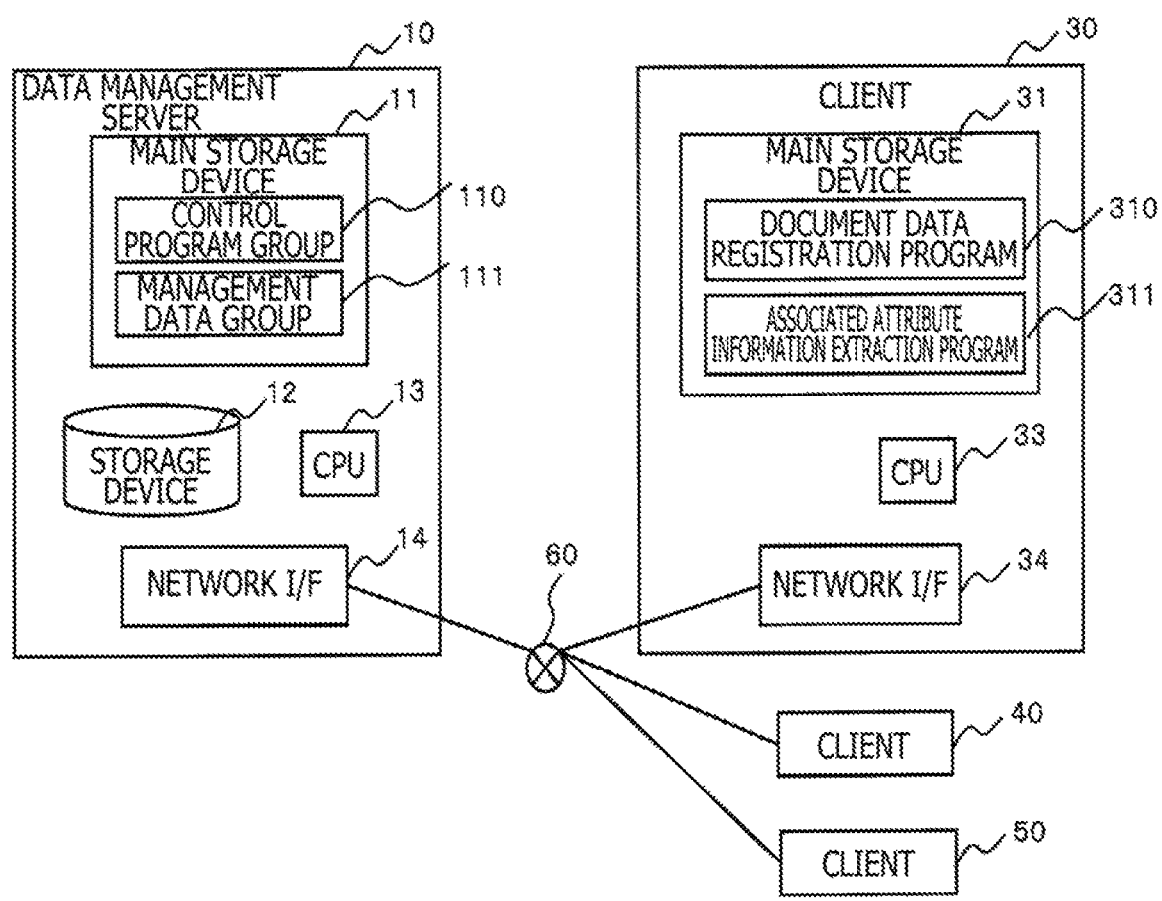
FIG. 1 depicts an example of a configuration of a computing machine system in a first embodiment.

FIG. 1 depicts an example of a configuration of a computing machine system in the first embodiment. The computing machine system is configured with a data management server 10, a plurality of clients 30, 40, and 50, and a network 60 for allowing communication among the data management server 10 and the clients 30, 40, and 50. While the attribute extraction apparatus according to the present invention mainly corresponds to the data management server 10, it can be supposed that the attribute extraction apparatus is configured to cooperate with the clients 30 to 50 as appropriate and it may be interpreted that any of the data management server 10 and the clients 30 to 50 or a combination thereof is the attribute extraction apparatus, and the same applies hereinafter.

The data management server 10 includes a main storage device 11, a storage device 12, a central processing unit (CPU) 13, a network interface (I/F) 14, a control program group 110, and a management data group 111. It is noted that the management data group 111 is data used by the control program group 110.

Among these constituent elements of the data management server 10, a random access memory (RAM) configured with a volatile memory is supposed as the main storage device 11. In addition, a solid state drive (SSD) or a hard disk drive (HDD) configured with a nonvolatile memory is supposed as the storage device 12.

Furthermore, the CPU 13 is a computing device that executes the control program group 110 held in the main storage device 11 and that implements necessary functions. In other words, the control program group 110 and the management data group 111 are deployed in the main storage device 11 and the control program group 110 is executed by the CPU 13.

Moreover, the network I/F 14 corresponds to a communication device that accesses the network 60 and that enables data communication with the clients 30 to 50.

Furthermore, the control program group 110 has a function to extract attribute information from a document, which is, for example, a chemical paper, in response to an information extraction request from any of the client 30, 40, or 50 and to transmit a result of performing an appropriate process in relation to the attribute information, that is, a result of performing an attribute extraction method, to the client 30, 40, or 50.

On the other hand, the client 30 includes a main storage device 31, a CPU 33, a network I/F 34, a document data registration program 310, and an associated attribute information extraction program 311.

Among these constituent elements of the client 30, a RAM configured with a volatile memory is supposed as the main storage device 31. Furthermore, the CPU 33 is a computing device that executes the document data registration program 310 and the associated attribute information extraction program 311 held in the main storage device 31 and that implements necessary functions. In other words, the document data registration program 310 and the associated attribute information extraction program 311 are deployed in the main storage device 31 and executed by the CPU 33.

In addition, the network I/F 34 corresponds to a communication device that accesses the network 60 and that enables data communication with the data management server 10.

The document data registration program 310 described above is a program for causing a user to register a document from which attribute information is to be extracted.

Furthermore, the associated attribute information extraction program 311 is a program for comprehensively outputting attribute information contained in the document registered by the document data registration program 310 and yet for causing the user to designate attribute information.

It is noted that functions of the document data registration program 310 and the associated attribute information extraction program 311 may be configured to be integrated into one. In addition, the data management server 10 may have the functions of the document data registration program 310 and the associated attribute information extraction program 311.

Furthermore, the clients 40 and 50 are configured similarly to the client 30 and description thereof will be, therefore, omitted.

It is noted that the data management server 10 and the plurality of clients 30 to 50 hold data communication as needed by using the network 60 to which the network I/F, for example, network I/F 14, 24, and 34, provided therein are connected.

A type of the network 60 may be a local area network (LAN), a wide area network (WAN), or any other network.

<Examples of Data>

FIG. 2 depicts details of the control program group 110 and the management data group 120 owned by the main storage device 11 of the data management server 10.

Out of these program groups, the control program group 110 includes an attribute information extraction processing section 113, an inter-attribute-information association degree calculation processing section 114, and a user-designated attribute information extraction processing section 115.

In addition, the management data group 120 includes a document information table 121, a document structure association degree calculation table group 122, an inter-attribute-information association degree table 123, an extracted attribute information list table 124, an inter-table association degree calculation table group 125, and an associated attribute information display table Group 126.

Furthermore, the document structure association degree calculation table group 122 includes an intra-document attribute name association degree table 1221, an intra-document attribute value association degree table 1222, and an inter-document-structure association degree table 1223.

Moreover, the inter-table association degree calculation table group 125 includes attribute-name-candidate-basis inter-attribute-information association degree tables 1251 and an inter-attribute statistical table 1252.

Furthermore, the associated attribute information display table group 126 includes a user-designated attribute information table 1261 and an associated attribute information table 1262.

FIG. 3 depicts an example of the document information table 121 in the first embodiment. The document information table 121 is a table for managing information about a user-registered document.

Furthermore, each record in this document information table 121 contains a document ID 1211, a document name 1212, and document data 1213.

Among these items, the document ID 1211 is an identifier that uniquely identifies a document. In addition, the document name 1212 is a name of the document. Furthermore, the document data 1213 is text data that is a content of the document. In other words, chemical papers or the like are stored in this document information table 121.

Moreover, FIG. 4 depicts an example of the extracted attribute information list table 124 in the first embodiment. This extracted attribute information list table 124 is a table that stores attribute information extracted from the documents in the document information table 121.

Each record in this extracted attribute information list table 124 contains an attribute information ID 1241, an attribute name 1242, an attribute value 1243, a document ID 1244, a section name 1245, an extraction location label 1246, and an attribute information importance degree 1247.

Among these items, the attribute information ID 1241 is an identifier that uniquely identifies an extracted attribute. In addition, the attribute name 1242 is a name of the extracted attribute, and a value, for example, "attribute name: Material," "attribute name: Chemical amount," or "attribute name: Melting point" is stored in the attribute name 1242.

Furthermore, the attribute value 1243 is an attribute value corresponding to the extracted attribute name, and a value such as "attribute value: Mate-A" corresponding to the "attribute name: Material," "attribute value: 10 mol" corresponding to "attribute name: Chemical amount," or "attribute value: 100K" corresponding to "attribute name: Melting point" is stored in the attribute value 1243.

Moreover, the document ID 1244 is an identifier of a document from which the attribute information is extracted, and has one value among the values recorded in columns of the document ID 1211.

Furthermore, the extraction location label 1246 is a label for identifying a location in the document where the attribute information is extracted. As a value of this extraction location label 1246, for example, the number of words, or row number or column number, from a beginning of a sentence in the document to the attribute name may be used.

Furthermore, the attribute information importance degree 1247 is a numeric value obtained by digitizing an importance degree of attribute information corresponding to the attribute information ID 1241 by an attribute extraction method.

FIG. 5 depicts an example of the intra-document attribute name association degree table 1221 in the first embodiment. The intra-document attribute name association degree table 1221 is a table for recording an association degree of the attribute name in one attribute information recorded in the extracted attribute information list table 124 with an attribute name in the other attribute information in the document.

Each record in this intra-document attribute name association degree table 1221 contains an attribute information ID 12211, an attribute name 12212, an attribute information candidate ID 12213, an attribute name candidate 12214, and an intra-document attribute name association degree 12215.

FIG. 5 depicts association degrees of the attribute name "Material" with the attribute names "Material," "Chemical amount," "Melting point," and "Pressure," and association degrees of the attribute name "Melting point" with the attribute names "Material," "Chemical amount," "Melting point," and "Pressure."

Among these items, the attribute information ID 12211 and the attribute name 12212 are an identifier and an attribute name of attribute information, for which associated attribute information is to be found, at a time of searching the associated attribute information, and correspond to a pair of the attribute information ID 1241 and the attribute name 1242 contained in each record in the extracted attribute information list table 124.

In addition, the attribute information candidate ID 12213 is an identifier for identifying an attribute name candidate associated with attribute information identified by a set of the attribute information ID 12211 and the attribute name 12212 when the associated attribute name candidate is present, and the value of the attribute information ID 1241 present in the extracted attribute information list table 124 and corresponding to the associated attribute name candidate is registered in the attribute information candidate ID 12213.

Furthermore, the attribute name candidate 12214 is an attribute name of associated attribute information. Moreover, the intra-document attribute name association degree 12215 is an attribute name association degree of the attribute name 12212 with the attribute name candidate 12214.

Furthermore, FIG. 6 depicts an example of the intra-document attribute value association degree table 1222 in the first embodiment. The intra-document attribute value association degree table 1222 is a table for recording an association degree of an attribute value of one attribute information with an attribute value of the other attribute information in the document.

Each record in this intra-document attribute value association degree table 1222 contains an attribute information ID 12221, an attribute value 12222, an attribute information candidate ID 12223, an attribute value candidate 12224, and an intra-document attribute value association degree 12225.

In the example depicted in FIG. 6, association degrees of the attribute value "Mate-A" with attribute values "Mate-A," "10 mol", "500K," and "1000 hPa" and association degrees of the attribute value "500K" with the attribute values "Mate-A," "10 mol," "500K," and "1000 hPa" are depicted.

In addition, the attribute information ID 12221 and the attribute value 12222 are an identifier and an attribute value of the attribute information, for which associated attribute information is to be found, at the time of searching the associated attribute information, and correspond to a pair of the attribute information ID 1241 and the attribute value 1243 in each record in the extracted attribute information list table 124.

Furthermore, the attribute information candidate ID 12223 is an identifier for identifying an attribute value candidate associated with attribute information identified by a set of the attribute information ID 12221 and the attribute value 12222 when the associated attribute value candidate is present, and the value of the attribute information ID 1241 present in the extracted attribute information list table 124 and corresponding to the associated attribute value candidate is registered in the attribute information candidate ID 12223. Moreover, the attribute value candidate 12224 is the associated attribute value candidate. The intra-document attribute value association degree 12225 is an attribute value association degree of the attribute value 12222 with the attribute value candidate 12224.

FIG. 7 depicts an example of the inter-document-structure association degree table 1223 in the first embodiment. The inter-document-structure association degree table 1223 is a table for recording an association degree of one attribute information with the other attribute information.

Each record in this inter-document-structure association degree table 1223 contains an attribute information ID 12231, an attribute name 12232, an attribute value 12233, an attribute information candidate ID 12234, an attribute name candidate 12235, an attribute value candidate 12236, an intra-document association degree 12237, and an inter-attribute-information association degree 12238.

In the example of FIG. 7, an association degree between attribute information "attribute name: Material, attribute value: Mate-A" and the attribute information "attribute name: Material, attribute value: Mate-A," an association degree between the attribute information "attribute name: Material, attribute value: Mate-A" and attribute information "attribute name: Chemical amount, attribute value: 10 mol," an association degree between the attribute information "attribute name: Material, attribute value: Mate-A" and attribute information "attribute name: Melting point, attribute value: 500K," an association degree between the attribute information "attribute name: Material, attribute value: Mate-A" and attribute information "attribute name: Pressure, attribute value: 1000 hPa," and the like are depicted.

The attribute information ID 12231, the attribute name 12232, and the attribute value 12233 contained in each record in the inter-document-structure association degree table 1223 are the identifier, the attribute name, and the attribute value of the attribute information, for which associated attribute information is to be found, at the time of searching the associated attribute information, and correspond to the attribute information ID 1241, the attribute name 1242, and the attribute value 1243 in each record in the extracted attribute information list table 124, respectively.

In addition, the attribute information candidate ID 12234 is an identifier for identifying a set candidate of an attribute name and an attribute value associated with attribute information identified by a set of values of the attribute information ID 12231, the attribute name 12232, and the attribute value 12233 when the set candidate of the attribute name and the attribute value is present, and the value of the attribute information ID 1241 in the extracted attribute information list table 124 corresponding to the set candidate of the associated attribute name and the associated attribute value is registered in the attribute information candidate ID 12234.

Furthermore, the attribute name candidate 12235 and the attribute value candidate 12236 are an attribute name and an attribute value of the associated attribute information. Moreover, the intra-document association degree 12237 is an association degree of the attribute name 12232 and the attribute value 12233 with the attribute name candidate 12235 and the attribute value candidate 12236 in each record within the document.

Furthermore, inter-attribute-information association degree 12238 is an association degree between the attribute information having the attribute information ID 12231 and the attribute information having the attribute information candidate ID 12234.

Further, FIGS. 8A to 8B each depicts an example of the attribute-name-candidate-basis inter-attribute-information association degree tables 1251 in the first embodiment.

Each record in the attribute-name-candidate-basis inter-attribute-information association degree tables 1251 contains such values as an attribute name 12512, an attribute value 12513, an attribute information candidate ID 12514, an attribute name candidate 12515, an attribute value candidate 12516, and an intra-document association degree 12517 with an attribute information ID 12551 that uniquely identifies attribute information as a key.

In addition, attribute-name-candidate-basis inter-attribute-information association degree table 1251 is a table for discriminating, per associated attribute name, the attribute information, for which associated attribute information is to be found, at the time of searching the associated attribute information, and a table is created per associated attribute name candidate.

Tables in FIGS. 8A, 8B, 8C, and 8D are the tables created per associated attribute name candidate. Each of FIGS. 8A, 8B, 8C, and 8D depicts a case in which the attribute name of the attribute information for which associated attribute information is to be found is "Melting point" in Tables in FIGS. BA to 8D and in which associated attribute names are "Material" in Table in FIG. 8A, "Chemical amount" in Table in FIG. 8B, "Pressure" in Table in FIG. 8C, and "Boiling point" in Table in FIG. 8D.

An attribute information ID 12511 in such attribute-name-candidate-basis inter-attribute-information association degree tables 1251 is an ID of one attribute information for which associated attribute information is to be found at the time of searching the attribute information associated with the attribute information.

In addition, the attribute information ID 12511, the attribute name 12512, the attribute value 12513, the attribute information candidate ID 12514, the attribute name candidate 12515, the attribute value candidate 12516, and the intra-document association degree 12517 correspond to the attribute information ID 12231, the attribute name 12232, the attribute value 12233, the attribute information candidate ID 12234, the attribute name candidate 12235, the attribute value candidate 12236, and the intra-document association degree 12237 in the inter-document-structure association degree table 1223, respectively.

It is noted that the attribute-name-candidate-basis inter-attribute-information association degree tables 1251 include records each of which contains a set of the attribute information for which associated attribute information is to be found and the associated attribute information candidate that are not present in the inter-document-structure association degree table 1223. In that case, a symbol that indicates no value in each of portions that cannot be expressed in the records is registered. As the symbol indicating no value, an arbitrary symbol such as "=" or "NULL" that can be distinguished from other valid values present in the tables may be used.

Figures 9, 10:
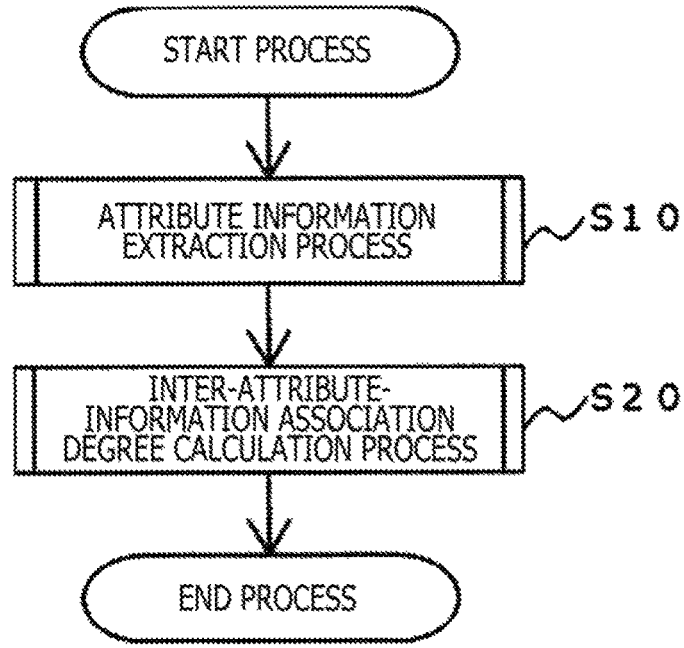
FIG. 9 depicts an example of an inter-attribute statistical table in the first embodiment.
FIG. 10 is a flowchart diagram of associated attribute information extraction in the first embodiment.

Furthermore, FIG. 9 depicts an example of the inter-attribute statistical table 1252 in the first embodiment. The inter-attribute statistical table 1252 is a table having various statistical values of the attribute names and the attribute name candidates on the basis of the records recorded in the inter-document-structure association degree table 1223.

Each record in such an inter-attribute statistical table 1252 contains an attribute name 12521, an attribute name candidate 12522, an attribute value count index 12523, a dispersion index 12524, an average inter-word association degree index 12525, and a total statistical index 12526.

Among these items, the attribute name 12521 and the attribute name candidate 12522 correspond to a set of the attribute name 12232 and the attribute name candidate 12235 in each record recorded in the inter-document-structure association degree table 1223.

In addition, the attribute value count index 12523 is an index set based on the number of records having the same recorded values of the set of the attribute name 12232 and the attribute name candidate 12235 in the records recorded in the inter-document-structure association degree table 1223.

Furthermore, the dispersion index 12524 is set for a plurality of records having the same recorded values of the set of the attribute name 12232 and the attribute name candidate 12235 in the records recorded in the inter-document-structure association degree table 1223, and is an index based on dispersion of recorded values of the attribute value candidates 12236.

Moreover, the average inter-word association degree index 12525 is sets for the plurality of records having the same recorded values of the set of the attribute name 12232 and the attribute name candidate 12235 in the records recorded in the inter-document-structure association degree table 1223, and is an index based on an average of recorded values of the intra-document association degrees 12237.

Furthermore, the total statistical index 12526 is a total statistical index of each record calculated on the basis of the attribute value count index 12523, the dispersion index 12524, and the average inter-word association degree index 12525 in the record.

<Example of Flows>

An example of flows of the attribute extraction method in the first embodiment will next be described. FIG. 10 depicts an example of an associated attribute information extraction flow in the first embodiment. Specifically, FIG. 10 is a flow depicting a flow of a process for extracting associated attribute information.

It is assumed that the document data registration program 310 has a user interface depicted as an attribute information extraction target document select screen 400, refer to FIG. 18, and that the associated attribute information extraction program 311 has a user interface depicted as an attribute information display screen 500, refer to FIG. 25.

A rough flow of extracting associated attribute information will be described herein. First, in an attribute information extraction process of Step S10, the attribute information extraction processing section 113 extracts attribute information from document data transmitted from any of the clients 30 to 50 to the data management server 10 via the network 60.

Next, in an inter-attribute-information association degree calculation process of Step S20, the attribute information extraction processing section 113 calculates an inter-attribute-information association degree using the attribute information extracted in Step S10. Details of the processes will be described later.

FIG. 11 is a flowchart diagram depicting a detailed example of the attribute information extraction process of Step S10 in the first embodiment. In this case, first in Step S11, the attribute information extraction processing section 113 receives at least one document from which information is to be extracted, from the client 30 via the network 60 in response to a user's command.

Next, in Step S12, the attribute information extraction processing section 113 extracts a document name and document data from the document received in Step S11, assigns a unique identifier to the document as a document ID, and then registers the document in the document information table 121.

Next, in Step S13, the attribute information extraction processing section 113 performs a predetermined preprocess for extracting attribute information from the document data extracted in Step S12.

A content of this preprocess is as follows. A process, for example, for handling a natural language such as identification of a directive and a pronoun, identification of a compound, and morphological analysis is supposed as this preprocess, and the preprocess is assumed to be adopted and executed as needed. A conventional technique may be adopted as this preprocess.

Next, in Step S14, the attribute information extraction processing section 113 extracts attribute information from the document data having been subjected to the preprocess in Step S13, and registers this attribute information in the extracted attribute information list table 124.

The attribute information extraction processing section 113 extracts the attribute name 1242 and the attribute value 1243 by performing attribute information extraction by a natural language process or the like in this Step S14. As such an extraction method, a rule-based extraction scheme, a scheme for mechanically extracting feature amounts of the attribute name and the attribute value on a document structure and extracting attribute information using the feature amounts, or the like may be adopted as appropriate.

Furthermore, the attribute information extraction processing section 113 refers to the document information table 121 and resisters an ID of the document from which the attribute information has been extracted as described above, as the document ID 1244. Likewise, the attribute information extraction processing section 113 registers a name of a section from which the attribute information has been extracted in the section name 1245.

Furthermore, the attribute information extraction processing section 113 registers a location of the extracted attribute information in the extraction location label 1246. This is a label for identifying the location where each piece of attribute information is extracted from the document, and the number of words from the beginning of a sentence to the attribute name or the like may be used as the label.

Moreover, the attribute information extraction processing section 113 registers a numeric value obtained by digitizing the importance degree of the extracted attribute information in the document in the attribute information importance degree 1247. This process corresponds to an action to preferentially present the attribute information described as an important point in the document and extracted from the document to the user. Examples of a method of calculating the attribute information importance degree include a method of giving a high importance degree to attribute information extracted from a specific section (section-basis index).

In a case, for example, of extracting information from a chemical paper, important information tends to be described in a section such as "Abstract" or "Conclusion." Owing to this, a high attribute information importance degree is given to the attribute information extracted from such a section as "Abstract" or "Conclusion."

Alternatively, in a case in which a specific word such as "important" or "extremely" is present within a fixed number of hops before and after the attribute information, a high attribute information importance degree may be given to the attribute information (word-basis index).

In another alternative, in a case in which many pieces of attribute information having the same attribute name and the same attribute value are extracted from the same document, a high attribute information importance degree may be given to the attribute information (index based on the number of times of extracting attribute information).

As a specific example in the above-described premise, the attribute information importance degree of one attribute information is calculated as expressed by an equation of Attribute information importance degree=S+W+N.

In this equation, S denotes the section-basis index, and S is set to "1" in a case in which the inter-attribute-information association degree is extracted from a specific section; otherwise, S is set to "0." in addition, W denotes the word-basis index, and W is set to "1" in a case in which a specific word is present before or after the attribute information; otherwise, N is set to "0." Furthermore, N denotes the index based on the number of times of extracting attribute information. N may be the number of times of extracting the attribute information in the document or may be standardized to a word appearance frequency in one document so that a value of N is in a range of "0" to "1." A concept of such standardization is assumed to be applicable to various values described hereinafter as appropriate.

More specifically, it is assumed that one attribute information is extracted from one portion in the specific section in the document; thus, S=1, a specific word appears once just before the attribute information in the document; thus, W=1, and that the appearance frequency of the attribute information in the document is three; thus, N=3. In this case, it can be calculated that the attribute information importance degree of the attribute information is 1+1+3=5. However, in a case in which a maximum value of the attribute information importance degree among those of all attribute information is, for example, "10," the importance degree "5" may be divided by this maximum value "10" and standardized to "0.5."

Description returns herein to the flow of FIG. 11. Next, in Step S15, the attribute information extraction processing section 113 filters attributes.

For example, in a case of information extraction from a chemical paper, a name of a specific material being assumed as "Mate-A" appears a plurality of times in one paper. In that case, many sets of "attribute name: Material, attribute value: Mate-A" are extracted from one paper as attribute information and each set is registered in each record in the extracted attribute information list table 124.

In the case in which the same attribute information is extracted from one paper a number of times as described above, it is suitable to delete redundant records from the extracted attribute information list table 124 in light of no difference in information among those pieces of attribute information.

In the case of, for example, information extraction from the chemical paper, there is a high probability that a content described in the important section such as "Abstract" or "Conclusion" in the paper is also described in a main body of the paper. Owing to this, the same attribute information as that extracted from "Abstract," "Conclusion," or the like is also extracted from the main body. In such a case, deleting exactly the same attribute information, that is, redundant records from within the extracted attribute information list table 124 is of no matter; thus, it is suitable to improve efficiency of data management and processes.

Finally, in Step S15, the attribute information extraction processing section 113 generates and registers the attribute information ID that is the identifier for uniquely identifying each record in the extracted attribute information list table 124 from which the redundant records have been deleted, and ends the process.

Next, the inter-attribute-information association degree calculation process of Step S20 will be described more specifically. FIG. 12 is a flowchart diagram depicting an example of the inter-attribute-information association degree calculation process of Step S20 in the first embodiment.

In this case, first in a document structure index calculation process of Step S21, the inter-attribute-information association degree calculation processing section 114 calculates an index, or a document structure index, for identifying the associated attribute information from a document structure of the document. The document structure index is an inter-attribute-information association degree, an importance degree of attribute information, or the like calculated on the basis of the document structure. Details of this process will be described later.

Next, in a statistical index calculation process of Step S22, the inter-attribute-information association degree calculation processing section 114 calculates an index, or a statistical index, for identifying the associated attribute information from a table structure based on the index obtained in the document structure index calculation process in Step S21.

The statistical index is an inter-attribute-information association degree calculated from dispersion, correlation, or the like of attribute values. Details of this process will be described later.

Next, in Step S23, the inter-attribute-information association degree calculation processing section 114 calculates an inter-attribute-information association degree using the document structure index calculated in Step S21 and the statistical index calculated in Step S22.

For example, a sum or a product between the value of the intra-document association degree 12237 in the inter-document-structure association degree table 1223 and the value of the total statistical index in the inter-attribute statistical table 1252 can be supposed as the inter-attribute-information association degree. In this case, the value of the intra-document association degree 12237 in a certain record contained in the inter-document-structure association degree table 1223 and the value of the total statistical index in the record having a set of values of the attribute name and the attribute name candidate in the certain record in the inter-attribute statistical table 1252 are assumed to be adopted.

In this case, the inter-attribute-information association degree calculation processing section 114 registers the inter-attribute-information association degree calculated in Step S23 as the value of the inter-attribute-information association degree 12238 in the record of interest contained in the inter-document-structure association degree table 1223. Likewise, the inter-attribute-information association degree calculation processing section 114 performs a process for registering values of the inter-attribute-information association degrees 12238 in all the records contained in the inter-document-structure association degree table 1223.

The document structure index calculation process of S21 will then be described. FIG. 13 is a flowchart diagram depicting an example of the document structure index calculation process of S21 in the first embodiment.

In this case, first in Step S211, the inter-attribute-information association degree calculation processing section 114 calculates an association degree between the attribute names of the attribute information extracted in the attribute information extraction process of Step S10, that is, an intra-document attribute name association degree, and creates the intra-document attribute name association degree table 1221.

A method of selecting one attribute name from among the attribute names described in the extracted attribute information list table 124 in such a manner as to select one attribute name that is not selected yet and that is closer to a top of the table, for example, the same applies hereinafter, and comprehensively selecting all the other attribute names having the same document ID as the document ID of the document in which the one selected attribute name appears as attribute name candidates can be supposed as a method of selecting an attribute name candidate. Alternatively, a method of selecting one attribute name from among the attribute names described in the extracted attribute information list table 124, and comprehensively selecting all the other attribute names having the same document ID as the document ID of the document in which the one selected attribute name appears and having the same section name as that of the selected attribute name as attribute name candidates can be supposed as the method of selecting an attribute name candidate.

Furthermore, the association degree between the attribute names may be calculated using, for example, a co-occurrence probability between the attribute names. The co-occurrence probability used because of a high probability that highly associated attribute names appear nearby in the document.

For example, in a case in which the word "Melting point" and the word "Pressure" are highly associated in a certain chemical paper, "Melting point" and "Pressure" tend to appear in nearby locations in the paper as depicted in FIG. 14. In this way, the probability that some words appear co-occurrently may be used to calculate the association degrees between the attribute names.

Next, in Step S212, the inter-attribute-information association degree calculation processing section 114 calculates an association degree between the attribute values of the attribute information extracted in the attribute information extraction process of Step S10, that is, an intra-document attribute value association degree, and creates the intra-document attribute value association degree table 1222.

A method of selecting one attribute value from among the attribute values described in the extracted attribute information list table 124, and comprehensively selecting all the other attribute values having the same document ID as the document ID of the document in which the one selected attribute value appears as attribute value candidates can be supposed as a method of selecting an attribute value candidate. Alternatively, a method of selecting one attribute value from among the attribute values described in the extracted attribute information list table 124, and comprehensively selecting all the other attribute values having the same document ID as the document ID of the document in which the one selected attribute value appears and having the same section name as that of the selected attribute value as attribute value candidates can be supposed as the method of selecting an attribute value candidate.

Furthermore, as a method of calculating the association degree between the attribute values, a scheme, for example, of using closeness between the attribute values in the document can be adopted.

It is assumed, for example, that four pieces of attribute information "attribute name: Melting point, attribute value: 500K," "attribute name: Melting point, attribute value: 600K," "attribute name: Pressure, attribute value: 1000 hPa," and "attribute name: Pressure, attribute value: 1500 hPa" are extracted from a document depicted in FIG. 14.

In that case, in light of the high probability that pieces of associated attribute information are described nearby in the document, it is considered that a pair of "attribute name: Melting point, attribute value: 500K" and "attribute name: Pressure, attribute value: 1000 hPa" and a pair of "attribute name: Melting point, attribute value: 600K" and "attribute name: Pressure, attribute value: 1500 hPa" are more highly associated.

Furthermore, as a method of calculating the intra-document attribute value association degree, a scheme based on modifications of the document or a rule-based scheme may be used.

Next, in Step S213, the inter-attribute-information association degree calculation processing section 114 calculates an intra-document association degree using the intra-document attribute name association degree table 1221 created in Step S211 and the intra-document attribute value association degree table 1222 created in Step S212, and registers this intra-document association degree in the inter-document-structure association degree table 1223.

Specifically, the inter-attribute-information association degree calculation processing section 114 extracts two records having the same attribute information ID and the same attribute information candidate ID from the intra-document attribute name association degree table 1221 and the intra-document attribute value association degree table 1222. In addition, the inter-attribute-information association degree calculation processing section 114 registers the attribute information ID, the attribute name, the attribute value, the attribute information candidate ID, the attribute name candidate, and the attribute value candidate contained in the two extracted records in the attribute information ID 12231, the attribute name 12232, the attribute value 12233, the attribute information candidate ID 12234, the attribute name candidate 12235, and the attribute value candidate 12236, respectively.

Furthermore, the inter-attribute-information association degree calculation processing section 114 calculates the intra-document association degree on the basis of the values of the intra-document attribute name association degree and the intra-document attribute value association degree contained in the two extracted records, and registers the calculated intra-document association degree in the intra-document association degree 12237 in the inter-document-structure association degree table 1223. A method of calculating the intra-document association degree may be a method of calculating a weighted-sum or a weighted-product between, for example, the intra-document attribute name association degree and the intra-document attribute value association degree contained in the two extracted records.

Moreover, in Step S214, the inter-attribute-information association degree calculation processing section 114 calculates an importance degree as expressed by the equation Attribute information importance degree=S+W+N or the like, where S is the section-based index, W is the word-based index, and N is the index based on the number of times of extracting attribute information, with respect to each record in the extracted attribute information list table 124, that is, the pair of the attribute name 1242 and the attribute value 1243 thereof, and registers this importance degree as the attribute information importance degree 1247.

It is noted that the inter-attribute-information association degree 12238 in the inter-document-structure association degree table 1223 may be blank in all records at a time of completing the present flow. Furthermore, after completion of the present flow, the inter-attribute-information association degree calculation processing section 114 transmits all the records in the extracted attribute information list table 124 to the associated attribute information extraction program 311.

Details of the statistical index calculation process of Step S22 will then be described. FIG. 15 is a flowchart diagram depicting an example of the statistical index calculation process in the first embodiment.

In this case, first in Step S221, the inter-attribute-information association degree calculation processing section 114 collects pieces of attribute information each having a high intra-document association degree calculated in Step S213, refer to flow of FIG. 13, per attribute name for the attribute information for which associated attribute information is to be found, and generates the attribute-name-candidate-basis inter-attribute-information association degree tables 1251.

For example, the inter-attribute-information association degree calculation processing section 114 collects, for "Melting point" as the attribute name of the attribute information for which associated attribute information is to be found, "Material," "Chemical amount," "Pressure," and "Boiling point" as the attribute names associated with "Melting point," and generates the tables for the respective associated attribute names.

As a method of creating such attribute-name-candidate-basis inter-attribute-information association degree tables 1251, the following method may be considered. The inter-attribute-information association degree calculation processing section 114 first extracts the attribute name from user-designated attribute information, refer to Step S312 in a flow of FIG. 24, and extracts all the attribute information candidates from within the records containing the extracted attribute name in the inter-document-structure association degree table 1223 as an attribute name candidate group.

In addition, the inter-attribute-information association degree calculation processing section 114 creates as many blank tables having the same schema, or a column definition, as that of the attribute-name-candidate-basis inter-attribute-information association degree tables 1251 as the attribute names belonging to the attribute information candidate group.

Next, the inter-attribute-information association degree calculation processing section 114 registers columns of the attribute information ID, the attribute names, and the attribute values obtained by extracting all the records containing the extracted attribute names in the extracted attribute information list table 124 as the attribute information IDs 12551, the attribute names 12512, and the attribute values 12513 in all the blank tables.

It is noted that in all records registered in each table, the attribute name candidates 12515 are null. Owing to this, the inter-attribute-information association degree calculation processing section 114 registers the value of the attribute name candidate corresponding to each table as the attribute name candidate 12515.

The inter-attribute-information association degree calculation processing section 114 searches a record, or a candidate record, containing a set of the same values of the attribute information ID 12231, the attribute name 12232, the attribute value 12233, and the attribute name candidate 12235 as a set of values of the attribute information ID 12511, the attribute name 12512, the attribute value 12513, and the attribute name candidate 12515 in each of all records in each table, from within the inter-document-structure association degree table 1223, and registers the values of the attribute information candidate ID, the attribute value candidate, and the intra-document association degree contained in the candidate record, if found, as the attribute information candidates ID 12514, the attribute value candidates 12516, and the intra-document association degrees 12517 in each of all the records in each table.

On the other hand, in a case in which the candidate record is not found, the inter-attribute-information association degree calculation processing section 114 registers a symbol, which may be "=," "NULL," or the like as described above, indicating a null value in each of the values of the attribute information candidate ID 12514, the attribute value candidate 12516, and the intra-document association degree 12517 in the record.

It is noted that the above table creation method is given as an example and that the other method that can create similar attribute-name-candidate-basis inter-attribute-information association degree tables 1251 may be used.

Description returns herein to the flow of FIG. 15. Subsequently, in Step S222, the inter-attribute-information association degree calculation processing section 114 calculates the statistical index for indicating an inter-table association degree from each of the tables created in Step S221, and creates the inter-attribute statistical table 1252.

The inter-table association degree index in Step S222 is an index statistically obtained from a table structure of the attribute-name-candidate-basis inter-attribute-information association degree tables 1251. In this case, the inter-attribute-information association degree calculation processing section 114 creates the inter-attribute statistical table 1252 using, for example, the following method.

First, the inter-attribute-information association degree calculation processing section 114 extracts the values of the attribute name and the attribute name candidate in each of the plurality of attribute-name-candidate-basis inter-attribute-information association degree tables 1251 created in Step S221, and registers the extracted values as the values of the attribute name 12521 and the attribute name candidate 12522 in the inter-attribute statistical table 1252.

Furthermore, the inter-attribute-information association degree calculation processing section 114 calculates values of the attribute value count index 12523, the dispersion index 12524, the average inter-word association degree index 12525, and the total statistical index 12526, and registers the values in each record in the inter-attribute statistical table 1252.

The attribute value count index is an index using the number of extracted attribute values of the associated attribute information. Since it is considered that the attribute name of the associated attribute information for which many attribute values are extracted as the associated attribute candidate gives much additional information to the attribute information for which the associated attribute information is to be found, the number of extracted attribute values is used as the index.

In the example of the attribute-name-candidate-basis inter-attribute-information association degree tables 1251 in FIGS. 8A to 8D, it is assumed, for example, that the number of attributes of the associated attribute candidates with "attribute name: Melting point" is "5" that is the number of attributes of "attribute name: Material," "4" that is the number of attributes of "attribute name: Chemical amount," "5" that is the number of attributes of "attribute name: Pressure," and "3" that is the number of attributes of "attribute name: Boiling point." In that case, the inter-attribute-information association degree calculation processing section 114 sets high the attribute value count index of each of "attribute name: Material" and "attribute name: Pressure" having the number of attributes "5," and sets low the attribute value count index of "attribute name: Boiling point" having the number of attributes "3."

As an example of calculation of such an attribute value count index, an attribute value count index $N(i)$ of one attribute name i can be calculated as expressed by an equation $N(i)=R$. In the equation, R denotes the number of attribute values.

Furthermore, the dispersion index is an index using the dispersion of the attribute values of the associated attribute information. Since it is considered that as the dispersion of the extracted attribute values of the associated attribute information as the associated attribute information candidate is larger for the attribute information for which the associated attribute information is to be found, the associated attribute candidate gives more additional information to the attribute information for which the associated attribute information is to be found, the dispersion of the attribute values is used as the index.

In the example of the attribute-name-candidate-basis inter-attribute-information association degree tables 1251 in FIGS. 8A to 8D, among the attribute values of the associated attribute information candidates for "attribute name: Melting point," those of "attribute name: Material," for example, are all different and the dispersion index of "attribute name:

Material" is, therefore, high. Furthermore, among "attribute name: Chemical amount," "attribute name: Pressure," and "attribute name: Boiling point," the dispersion index of "attribute name: Boiling point" having large dispersion of attribute values is high, and the dispersion index of "attribute name: Chemical amount" having small dispersion of attribute values is low.

As an example of calculation of such a dispersion index, a dispersion index D(i) of one attribute name i for a numeric value can be calculated as expressed by an equation D(i)=d(i).

Moreover, the average inter-word association degree index is an index using an average value of the intra-document association degrees calculated in Step S213. Since it is considered that the attribute information for which the associated attribute information is to be found and attribute information having a higher intra-document association degree on average as the associated attribute information are higher in association degree, the intra-document association degree is used as the index.

In the example of the attribute-name-candidate-basis inter-attribute-information association degree tables 1251 in FIGS. 8A to 8D, the average inter-word association degree index is set, for example, such that the average inter-word association degree index of "attribute name: Material" having a high intra-document association degree on average as the attribute information candidate for "attribute name: Melting point" is high, and the average inter-word association degree index of "attribute name: Chemical amount" having a low intra-document association degree on average as the attribute information candidate for "attribute name: Melting point" is low.

As an example of calculation of the average inter-word association degree index, an average inter-word association degree index ATR(i) of one attribute name i can be obtained as expressed by the following equation.

$$ATR(i) = \Sigma_{r=1}^{R} atr(r)/R$$

In the equation, R denotes the attribute value count and atr(r) denotes the intra-document association degree of individual attribute information.

As the other attribute information importance degree, an average importance degree of the attribute information importance degrees calculated in Step S214 may be added to each record as a new index for the inter-attribute statistical table 1252.

Likewise, a degree of correlation between each attribute value of the attribute information for which the associated attribute information is to be found and that of the associated attribute information may be added as an index.

Finally, in Step S223, the inter-attribute-information association degree calculation processing section 114 calculates a total value on the basis of a plurality of calculated index values in each record in the inter-attribute statistical table 1252, and registers the calculated total value as a value of the total statistical index 12526 in the record.

Here, as an example of calculation of a total statistical index T(i) for the attribute name i, the total statistical index T(i) can be calculated as expressed by the following equation.

$$ATR(i) = \sum_{r=1}^{R} atr(r)/R$$

In the equation, w1, w2, and w3 denotes weights of statistical indexes. Alternatively, the total value may be a product of the inter-table association degree indexes calculated in Step S223.

Furthermore, FIG. 16 depicts an example of a flow of a user-designated attribute information extraction process in the first embodiment. The process in this flow includes a process for transmitting the attribute-name-candidate-basis inter-attribute-information association degree tables 1251 to the associated attribute information extraction program 311. It is supposed that the present flow is performed in a situation in which user-designated document data is transmitted from the client 30, 40, or 50 to the data management server 10 via the attribute information extraction target document select screen 400, refer to FIG. 18, and execution of Steps S10 and S20 is completed.

It is also assumed that the document data registration program 310 in the first embodiment has a user interface depicted as the attribute information extraction target document select screen 400, refer to FIG. 18, and the associated attribute information extraction program 311 has a user interface depicted as an attribute information search screen 600, refer to FIG. 19.

In this case, in Step S321, the associated attribute information extraction program 311 of the client 30, as a representative client for the sake of description, extracts sets of the attribute name and the attribute value in each record on the basis of all the records in the extracted attribute information list table 124 received after performing Step S20 by the data management server 10, and comprehensively displays the corresponding attribute values per extracted attribute name on an extracted attribute list display section 601 on the attribute information search screen 600.

Furthermore, in Step S322, the associated attribute information extraction program 311 transmits values, or transmitted attribute name group, input to a user-selected attribute name input section 602 and a user-designated associated attribute information search attribute name input section 603 to the user-designated attribute information extraction processing section 115 of the data management server 10 in response to depression of a search button 606 contained in the attribute information search screen 600.

On the other hand, in Step S323, the user-designated attribute information extraction processing section 115 of the data management server 10 acquires all of attribute names, or user-selected attribute names, input to the user-selected attribute name input section 602 from the user-transmitted attribute name group transmitted from the client 30, and acquires attribute values corresponding to all the user-selected attribute names.

For example, the user-designated attribute information extraction processing section 115 acquires "attribute name: Material" and "attribute name: Melting point" input by the user as the user-selected attribute names, and acquires "attribute value: Mate-A" and "attribute value: Mate-B" as the attribute values corresponding to "attribute name: Material," and "attribute value: 500K" and "attribute value: 600K" as the attribute values corresponding to "attribute name: Melting point."

Next, in a case in which a plurality of user-selected attribute names have been transmitted in Step S323, or Step S324: YES, then, in Step S325, the user-designated attribute information extraction processing section 115 refers to the intra-document association degrees 12237 in the inter-document-structure association degree table 1223 calculated in Step S213, and finds associated attribute values among the attribute values of the plurality of attribute names transmitted in Step S323.

For example, in a case in which two types of user-selected attribute names, that is, attribute names A and B have been transmitted, the user-designated attribute information extraction processing section 115 refers to the attribute names 12232, the attribute name candidates 12235, and the intra-document association degrees 12237 in the inter-document-structure association degree table 1223, acquires the record in which the attribute name matches the attribute name A, the attribute name candidate matches the attribute name B, and the intra-document association degree is equal to or higher than a threshold, and displays the attribute value and the attribute value candidate in the acquired record on the same record of an attribute information display section 605 on the attribute information search screen 600 of the client 30.

For example, in a case in which the user inputs "attribute name: Material" and "attribute name: Melting point" and the user-designated attribute information extraction processing section 115 acquires "attribute name: Mate-A," "attribute name: Mate-B," "attribute name: 500K," and "attribute name: 600K," then the user-designated attribute information extraction processing section 115 refers to the intra-document association degrees 12237, finds pairs of attribute information such as a pair of "attribute name: Material, attribute value: Mate-A" and "attribute name: Melting point, attribute value: 500K" and a pair of "attribute name: Material, attribute value: Mate-A" and "attribute name: Melting point, attribute value: 600K" having the intra-document association degrees higher than the threshold, and displays those pieces of information on the same record of the attribute information display section 605.

On the other hand, in a case of user's inputting only one user-selected attribute name, or Step S324: NO, the process goes to Step S326 to be described next.

Next, in Step S326, the associated attribute information extraction program 311 of the client 30 transmits the values input to the user-designated associated attribute information search attribute name input section 603 to the user-designated attribute information extraction processing section 115 of the data management server 10 in response to user's input of a user-designated associated attribute information search attribute name to the user-designated associated attribute information search attribute name input section 603. Here, the attribute name input to the user-designated associated attribute information search attribute name input section 603 is designated from among the user-selected attribute names.

On the other hand, in Step S327, the user-designated attribute information extraction processing section 115 of the data management server 10 acquires the user-designated associated attribute information search attribute name transmitted from the client 30 and input to the user-designated associated attribute information search attribute name input section 603.

Furthermore, in Step S328, the associated attribute information extraction program 311 of the client 30 transmits a selection result to the user-designated attribute information extraction processing section 115 of the data management server 10 in response to user's selection of the user-designated table index in a user-designated table index input section 604.

Here, the user-designated table index is an index for user's searching the associated attribute information, and examples of the table index, referred to as "user-designated table index," as presented in Step S222 includes the "attribute value count index," the "dispersion index," and the "average inter-word association degree index." Selecting the index for user's searching the associated attribute information in this step enables the data management server 10 to display the attribute information closer to the user-desired associated attribute information on the client 30.

On the other hand, in Step S329, the user-designated attribute information extraction processing section 115 of the data management server 10 acquires the user-designated table index, for example, "average inter-word association degree index" transmitted from the client 30.

Furthermore, the associated attribute information extraction program 311 of the client 30 transmits an indication of user's depression of the search button 606 to the user-designated attribute information extraction processing section 115 of the data management server 10 in response to user's depression of the search button 606. In addition, in Step S3210, the associated attribute information extraction program 311 performs a highly associated attribute information calculation process using the user-designated associated attribute information search attribute name acquired in Step S327 and the user-designated table index obtained in Step S329, and calculates attribute information associated with the user-designated associated attribute information search attribute name. Details of this process will be described later.

In Step S3211, the associated attribute information extraction program 311 of the client 30 displays the attribute information associated with the user-designated associated attribute information search attribute name calculated in Step S3210 in an associated attribute information display section 607 in descending order of association degree.

For example, in a case in which "attribute name: Pressure," "attribute name: Electric current," "attribute name: Magnetic field," "attribute name: Chemical amount," and the like are determined as the attribute names associated with "attribute name: Melting point" in the highly associated attribute information calculation process of Step S3210, the associated attribute information extraction program 311 of the client 30 displays the attribute names and the attribute values in descending order of attribute group association degree.

In a case in which the user selects associated attribute information in Step S3212, or Step S3212: YES, the associated attribute information extraction program 311 transmits a selection result to the user-designated attribute information extraction processing section 115 of the data management server 10. The user-designated attribute information extraction processing section 115 in this case receives the selection result in Step S3213.

Moreover, the user-designated attribute information extraction processing section 115 adds columns of associated attribute information selected by the user as described above to the user-selected attribute name input section 602.

On the other hand, in a case in which the user does not select attribute information, or Step S3212: NO, the process goes to Step S3214 to be described later.

Furthermore, in Step S3214, the user-designated attribute information extraction processing section 115 changes a method of calculating highly associated attribute information on the basis of user-selected attribute information.

For example, as a way to change the method of calculating highly associated attribute information, the weight of each statistical index at the time of calculating total statistical index may be changed or the weight of the index characteristic of the user-selected attribute information among the document structure index and the statistical index may be increased when the inter-attribute-information association degree is calculated.

Next, in a case in which the user desires to continuously select attributes associated with the user-designated associated attribute information search attribute name in Step S3213 and the user further desires to select the other user-designated attribute information in Step S3214, the user-designated attribute information extraction processing section 115 returns the process to Step S326.

Next, in a case in which the user desires to continuously select attributes associated with the user-designated associated attribute information search attribute name, or Step S3215: YES, and the user further desires to select the other user-designated attribute information, or Step S3216: YES, the user-designated attribute information extraction processing section 115 returns the process to Step S326.

On the other hand, in a case in which the user desires to continuously select attributes associated with the user-designated associated attribute information search attribute name, or Step S3215: YES, and the user does not further desire to select the other user-designated attribute information, or Step S3216: NO, the user-designated attribute information extraction processing section 115 returns the process to Step S329.

Furthermore, in a case in which the user does not desire to continuously select attributes associated with the user-designated associated attribute information search attribute name, or Step S3215: NO, the user-designated attribute information extraction processing section 115 ends the process.

FIG. 17 depicts an example of a flow of the highly associated attribute information calculation process of S3210 in the first embodiment. The present flow is a flow for determining attribute information that is associated with the user-designated associated attribute information search attribute name and that is to be presented to the user using the user-designated associated attribute information search attribute name acquired in Step S327 and the user-designated table index obtained in Step S329.

First in Step S3281, the user-designated attribute information extraction processing section 115 extracts attribute information for which the statistical index is calculated.

A purpose of this process is to make it possible to recommend attribute information for adding more additional information to the user-designated associated attribute information search attribute name by narrowing down attribute information for which the statistical index is to be calculated on a certain condition.

As an example of narrowing down the attribute information for which the statistical index is calculated, a scheme for selecting attribute information having the intra-document association degrees 12237 that is calculated in Step S213 and that is equal to or higher than a predetermined threshold can be supposed.

For example, while pieces of attribute information are less associated and the intra-document association degrees of most of the extracted attribute information are low in general, there is a specific case in which the pieces of attribute information are highly associated and the intra-document association degrees thereof are, therefore, high. In this case, by calculating the inter-table association degree indexes for all pieces of attribute information candidates and evaluating the inter-attribute-information association degree, the inter-attribute-information association degree used to finally present the associated attribute information to the user becomes low even if the pieces of attribute information having the high inter-attribute-information association degree are present in the specific case.

However, handling only the pieces of attribute information having high intra-document association degrees makes it possible to increase the inter-attribute-information association degree between the pieces of attribute information highly associated in the specific case.

For the reasons, the statistical index is calculated using only the attribute information having the intra-document association degree 12237 equal to or higher than a threshold. As a flow of the process, the user-designated attribute information extraction processing section 115 refers to the intra-document association degrees 12237 in the inter-document-structure association degree table 1223, and holds the attribute information candidate ID 12231, the attribute name candidate 12235, the attribute value candidate 12236, and the intra-document association degree 12237 of the attribute information present in the same record as that of the attribute information having the attribute name 12232 matching the user-designated associated attribute information search attribute name acquired in Step S327 and having the intra-document association degree equal to or higher than a predetermined threshold.

As another example of narrowing down attribute information for which the inter-table association degree index is calculated, the inter-table association degree index may be calculated, for example, only for the attribute information having the high attribute information importance degree calculated in Step S214.

For example, there is a probability that the attribute information that does not have a very high intra-document association degree but that is regarded as an important point in the document gives much additional information to the existing attribute information. Owing to this, calculating the inter-table association degree index while the attribute information is narrowed down to that having the high attribute information importance degree makes it possible to present the attribute information that can give more additional information to the user-designated attribute information to the user.

As a flow of the process, the user-designated attribute information extraction processing section 115 refers to the attribute information importance degrees 1247 in the extracted attribute information list table 1241 and holds attribute information IDs for which the attribute information importance degrees are equal to or higher than the threshold.

Furthermore, the user-designated attribute information extraction processing section 115 refers to the attribute names 12232 in the inter-document-structure association degree table 1223. In a case in which the record has the attribute name 12232 matching the user-designated associated attribute information search attribute name and the attribute information candidate ID in the same record matches the attribute information candidate ID of the attribute information having the attribute information importance degree equal to or higher than the threshold, the user-designated attribute information extraction processing section 115 holds the attribute information candidate ID 12231, the attribute name candidate 12235, the attribute value candidate 12236, and the intra-document association degree 12237 in the record.

Furthermore, as another example, in a case in which a plurality of pieces of attribute information having the same attribute name but having different attribute values are extracted from one document and a plurality of pieces of attribute information having the same attribute name but having different attribute values are extracted therefrom as the attribute information associated with the extracted attribute information, the inter-table association degree index is calculated only for the attribute information.

It is assumed, for example, that the attribute information "attribute name: Melting point, attribute value: 500K" and the attribute information "attribute name: Pressure, attribute value: 1000 hPa" associated with "attribute name: Melting point, attribute value: 500K," and the attribute information "attribute name: Melting point, attribute value: 600K" and the attribute information "attribute name: Pressure, attribute value: 1500 hPa" associated with "attribute name: Melting point, attribute value: 600K" are extracted from one paper.

In that case, as attribute information for distinguishing the pieces of attribute information having the same attribute name but having different attribute values, that is, "attribute name: Melting point, attribute value: 500K" and "attribute name: Melting point, attribute value: 600K," the pieces of attribute information having the same attribute name but having different attribute values, that is, "attribute name: Pressure: attribute value: 1000 hPa" and "attribute name: Pressure: attribute value: 1500 hPa" are considered to be of significance.

Owing to this, in a case in which a plurality of pieces of extracted attribute information having different attribute values are extracted and in which a plurality of pieces of attribute information having the same attribute name associated with the attribute information but having different attribute values are extracted, the inter-table association degree index may be calculated only for the attribute information.

Furthermore, as an example of attribute information for which the statistical index is calculated, the statistical index may be calculated for a combination of the pieces of attribute information described above or for all attribute information candidates. Moreover, a step of user's determining to calculate the statistical index on what condition may be provided.

Furthermore, In Step S3282, the user-designated attribute information extraction processing section 115 calculates the statistical index using the attribute information candidate ID 12234, the attribute name candidate 12235, the attribute value candidate 12236, and the intra-document association degree 12237 held in Step S3281, thereby creating attribute-name-candidate-basis inter-attribute-information association degree tables 1251 and the inter-attribute statistical table 1252. A way to create these tables are equivalent to the statistical index calculation process in Step S22 in the first embodiment.

Moreover, in Step S3283, the user-designated attribute information extraction processing section 115 refers to the total statistical indexes 12521 in the inter-attribute statistical table 1252 created in Step S3282 and reorders the total statistical indexes in ascending order.

Through the above process, preferentially reordering the attribute information that can give additional information to the user-designated associated attribute information search attribute name and displaying the attribute information to the client 30 of the user make it possible to shorten user's attribute information selection time.

Now, a specific configuration of the attribute information extraction target document select screen 400 will be described. FIG. 18 depicts an example of the attribute information extraction target document select screen 400 in the first embodiment.

The attribute information extraction target document select screen 400 is a screen used for a user operating the client 30 to select a document from which attribute information is extracted.

This attribute information extraction target document select screen 400 is part of the associated attribute information extraction program 311 held by the client 30 and includes a document name display section 401, a document selection section 402, and a "document selection completed" button 403.

Among these constituent elements, the document name display section 401 is a box for displaying a list of documents from which information is to be extracted. In addition, the document selection section 402 is a box for user's selecting the document from which attribute information is extracted. Furthermore, the document selection end button 403 is a box depressed by the user at a time of ending document selection.

In this case, the user selects the document from which attribute information is extracted from among the documents displayed in the document name display section 401 by the document selection section 402. Upon completion of selecting all the documents from which information is extracted, the user depresses the document selection end button 403.

User's depressing the button enables information about one selected document data or a plurality of pieces of selected document data to be transmitted to the data management server 10 via the network 60. Steps S10 and S20 in the flow of FIG. 10 are thereby performed. After performing this Step S20, all the records in the extracted attribute information list table 124 are transmitted from the data management server 10 to the associated attribute information extraction program 311 of the client 30.

Furthermore, a specific configuration of the attribute information search screen 600 will be described. FIG. 19 depicts an example of the attribute information search screen 600 in the first embodiment.

The attribute information search screen 600 is a screen for displaying user-designated attribute names and attribute name candidates associated with the user-designated attribute names.

This attribute information search screen 600 includes the extracted attribute list display section 601, the user-selected attribute name input section 602, the user-designated associated attribute information search attribute name input section 603, the user-designated table index input section 604, the selected attribute information display section 605, the search button 606, and the associated attribute information display section 607.

Among these constituent elements, the extracted attribute list display section 601 is a box for displaying a list of attribute information extracted from an input document. In addition, the user-selected attribute name input section 602 is a box for user's inputting attribute names of attribute information to be displayed among the attribute information extracted from the input document.

Furthermore, the user-designated associated attribute information search attribute name input section 603 is a box for inputting an attribute name for which associated attribute information is to be searched among the displayed attribute names input by the user. Moreover, the user-designated table index input section 604 is a box for inputting a table index used at the time of searching attribute information associated with the designated attribute name.

Furthermore, the selected attribute information display section 605 is a box for displaying the displayed attribute names input by the user and attribute values corresponding to the displayed attribute names. Moreover, the search button 606 is a button depressed by the user at the time of searching the associated attribute information.

Furthermore, the associated attribute information display section 607 is a box for displaying attribute information associated with the designated attribute names input by the user. The associated attribute information is displayed in descending order of the inter-table association degree obtained using the user's input table index.

For example, the data management server 10 acquires the user-selected attribute names input to the user-selected attribute name input section 602 of the client 30 by the user in Step S323, and displays the information in the selected attribute information display section 605.

Furthermore, when user inputs the user-designated associated attribute information search attribute name to the user-designated associated attribute information search attribute name input section 603, selects the user-designated table index in the user-designated table index input section 604, and then depresses the search button 606, then the client 30 and the data management server 10 cooperate with each other to calculate the inter-attribute-information association degrees in Steps S326 to S328, and displays the highly associated attribute information in the associated attribute information display section 607 in descending order of association degree.

Second Embodiment

In a second embodiment, a process for determining associated attribute information preferentially displayed to a user in a case in which a plurality of user-designated associated attribute information search attribute names are input to the user-designated associated attribute information search attribute name input section 603 on the attribute information search screen 600 will be described. In the present embodiment, the highly associated attribute information calculation process is changed from that in the first embodiment among the processes in the first embodiment.

FIG. 20 depicts an example of a flow of the highly associated attribute information calculation process in the second embodiment. In this case, first, the user-designated attribute information extraction processing section 115 of the data management server 10 calculates highly associated attributes in Steps S3281M, S3282M, and S3283M in relation to one user-designated associated attribute name among a plurality of user-designated associated attribute names input by the user to the client 30.

Since Steps S3281M, S3282M, and S3283M are similar in process content to Steps S3281, S3282, and S3283 in the first embodiment, description thereof will be omitted.

After Step S3283M, in a case in which highly associated attributes have not been calculated for all user-designated associated attribute names, or Step S3284M: NO, the data management server 10 returns the process to Step S3281M.

On the other hand, in a case in which highly associated attributes have been calculated for all user-designated associated attribute names, or Step S3284M: YES, the data management server 10 returns the process to Step S3285M.

In Step S3285M, the data management server 10 determines attribute information to be preferentially presented to the user from the attribute names highly associated with the user-designated associated attribute names calculated up to Step S3284M.

For example, as depicted in FIG. 21, in a case in which the user inputs user-designated associated attribute names 1 and 2 as two user-designated associated attribute names, associated attribute names 1, 2, and 3 are present as three associated attributes associated with the user-designated associated attribute names 1 and 2, and association degrees between the user-designated associated attribute names 1 and 2 and the associated attribute names 1 to 3 are the same as those depicted in FIG. 21, the data management server 10 determines a sequence of the attribute information in which the attribute information is presented to the user.

The user-designated attribute information extraction processing section 115 supposes the sequence in descending order of sum, or average value, of the inter-attribute-information association degrees. In the case of FIG. 21, for example, a sum, or average value, of the inter-attribute-information association degrees of the associated attribute name 1 is 1.0 (0.5), a sum, or average value, of the inter-attribute-information association degrees of the associated attribute name 2 is 1.2 (0.6), and a sum, or average value, of the inter-attribute-information association degrees of the associated attribute name 3 is 0.9 (0.45); thus, the data management server 10 determines the sequence of the attribute information in which the attribute information is presented to the user as a sequence of the associated attribute name 2, the associated attribute name 1, and the associated attribute name 3.

Furthermore, as another example, the data management server 10 may determine a sequence in descending order of maximum value of the inter-attribute-information association degrees. In the case of FIG. 21, for example, a maximum value of the inter-attribute-information association degrees of the associated attribute name 1 is 0.9, a maximum value of the inter-attribute-information association degrees of the associated attribute name 2 is 0.6, and a maximum value of the inter-attribute-information association degrees of the associated attribute name 3 is 0.8; thus, the data management server 10 determines the sequence of the attribute information in which the attribute information is presented to the user as a sequence of the associated attribute name 1, the associated attribute name 3, and the associated attribute name 2. As yet another example, the data management server 10 may determine the sequence in descending order of average value of inter-attribute-information association degrees.

Furthermore, in a case of presence of a plurality of indexes for determining the sequence of attribute information in which the attribute information is presented to the user, a step of determining what index is used to determine the sequence of the attribute information may be provided.

Third Embodiment

In a third embodiment, a process for presenting other attribute information associated with one user-designated attribute information by extracting characteristic attribute information from a chemical paper and calculating association degrees between the extracted attribute information will be described. In this third embodiment, the user-designated attribute information extraction process is changed from that in the first embodiment among the processes in the first embodiment.

FIG. 22 depicts an example of a user-designated attribute information table 1261 in the third embodiment. This user-designated attribute information table 1261 is a table used at a time of displaying data related to user-designated attribute information.

Each record in this user-designated attribute information table 1261 contains an attribute information ID 12611, an attribute name 12612, an attribute value 12613, a document ID 12614, an extraction location label 12616, and document data 12617.

Among these items, the attribute information ID 12611 is an ID of attribute information matching user input attribute information. In addition, the attribute name 12612 is an attribute name of the attribute information matching the user input attribute information.

Furthermore, the attribute value 12613 is an attribute value of the attribute information matching the user input attribute information. Moreover, the document ID 12614 is an ID of a document from which an attribute having the attribute information ID 112611 is extracted.

Furthermore, the document name 12615 is a document name of the document from which the attribute having the attribute information ID 12611 is extracted. Moreover, the extraction location label 12616 is a label of a location where the attribute information having the attribute information ID 12611 is extracted.

Further, the document data 12617 is sentences around the location where the attribute information having the attribute information ID 12611 is extracted.

Furthermore, FIG. 23 depicts an example of an associated attribute information table 1262 in the third embodiment. This associated attribute information table 1262 is a table used at a time of recommending attribute information associated with user-designated attribute information.

Each record in this associated attribute information table 1262 contains an attribute information ID 12621, an attribute name 12622, an attribute value 12623, an attribute information candidate ID 12624, an attribute name candidate 12625, an attribute value candidate 12626, an inter-attribute-information association degree 12627, a document ID 12628, a document name 12629, an extraction location label 126210, and document data 126211.

Among these items, the attribute information ID 12621 is an ID of attribute information for which associated attribute information is to be found at the time of searching the associated attribute information. In addition, the attribute name 12622 is an attribute name of the attribute information for which associated attribute information is to be found at the time of searching the associated attribute information.

Furthermore, the attribute information 12623 is an attribute value of the attribute information for which associated attribute information is to be found at the time of searching the associated attribute information. Moreover, the attribute information candidate ID 12624 is an ID of an attribute information candidate associated with the attribute information for which associated attribute information is to be found at the time of searching the associated attribute information.

Furthermore, the attribute name candidate 12625 is an attribute name of the attribute information candidate associated with the attribute information for which associated attribute information is to be found at the time of searching the associated attribute information. Moreover, the attribute value candidate 12626 is an attribute value of the attribute information candidate associated with the attribute information for which associated attribute information is to be found at the time of searching the associated attribute information.

Furthermore, the inter-attribute-information association degree 12627 is an association degree between the attribute information having the attribute information ID 12621 and that having the attribute information candidate ID 12624. Moreover, the document ID 12628 is an ID of a document from which the attribute information having the attribute information candidate ID 12624 is extracted.

Furthermore, the document name 12629 is a document name of the document from which the attribute information having the attribute information candidate ID 12624 is extracted. Moreover, the extraction location label 126210 is a label of a location where the attribute information having the attribute information candidate ID 12624 is extracted.

Furthermore, the document data 126211 is sentences around the location where the attribute information having the attribute information candidate ID 12624 is extracted.

FIG. 24 depicts an example of a flow of the user-designated attribute information extraction process in the third embodiment. The present flow is a flow for extracting attribute information associated with user-selected attribute information using the inter-attribute-information association degree calculated in Step S20. Specifically, the flow is a flow of a process for data management server 10 to transmit the user-designated attribute information table 1261 and the associated attribute information table 1262 to the associated attribute information extraction program 311 of the client 30.

In Step S310, the associated attribute information extraction program 311 of the client 30 extracts sets of the attribute name and the attribute value in each record on the basis of all the records in the extracted attribute information list table 124 received after performing Step S20 by the data management server 10, and comprehensively displays the corresponding attribute values per extracted attribute name on an extracted attribute list display section 501 on the attribute information display screen 500, refer to FIG. 25.

Subsequently, in Step S311, the associated attribute information extraction program 311 transmits attribute names and attribute values input to a user-designated attribute information input section 502 to the user-designated attribute information extraction processing section 115 of the data management server 10 in response to user's depression of a search button 503 contained in the attribute information display screen 500.

On the other hand, in Step S312, the user-designated attribute information extraction processing section 115 of the data management server 10 acquires the attribute names and the attribute values received from the client 30.

Furthermore, in Step S313, the user-designated attribute information extraction processing section 115 searches attribute information matching the user-designated attribute information transmitted from the client 30 in the extracted attribute information list table 124.

In a case in which there is the attribute information matching the user-designated attribute information, or Step S314: YES, the user-designated attribute information extraction processing section 115 refers to the document information table 121 and the extracted attribute information list table 124, acquires a record containing the attribute information ID, the attribute name, the attribute value, the document ID, the document name, the extraction location label, and the document data of the attribute information matching the user-designated attribute information transmitted from the client 30, and adds the acquired record to the user-designated attribute information table 1261 in Step S315.

On the other hand, in a case in which there is no attribute information matching the user-designated attribute information as a result of Step S313, or Step S314: NO, the user-designated attribute information extraction processing section 115 displays an indication that there is no attribute information matching the user-designated attribute information on the attribute information display screen 500 of the client 30 and ends the process.

Furthermore, in Step S317, after acquiring the attribute information matching the user-designated attribute information in Step S315, the user-designated attribute information extraction processing section 115 extracts all the records each containing a set of values of the attribute name 12612 and the attribute value 12613 from the inter-document-structure association degree table 1223 for each record in the user-designated attribute information table 1261 created in Step S315. Furthermore, the user-designated attribute information extraction processing section 115 acquires only the record in which the inter-attribute-information association degree is equal to or higher than the predetermined threshold among the extracted records herein, acquires the records corresponding to the attribute information candidate ID in the record acquired herein from the extracted attribute information list table 124, and adds the acquired record to the associated attribute information table 1262.

For example, as a result of user's input of "attribute name: Material, attribute value: Mate-A" as the user-designated attribute information, the user-designated attribute information extraction processing section 115 acquires "attribute name: Melting point, attribute value: 500K," "attribute name: density, attribute value: 19 g/cm$^3$" and the like as attribute information each having a high inter-attribute-information association degree with "attribute name: Material, attribute value: Mate-A."

Next, in Step S318, the user-designated attribute information extraction processing section 115 searches attribute information having the inter-attribute-information association degree equal to or higher than the predetermined threshold from all attribute information selected in Step S317.

For example, as in the above example, in a case in which as a result of user's input of "attribute name: Material, attribute value: Mate-A" as the user-designated attribute information, the user-designated attribute information extraction processing section 115 acquires "attribute name: Melting point, attribute value: 500K," "attribute name: density, attribute value: 19 g/cm$^3$," and the like as attribute information each having a high inter-attribute-information association degree with "attribute name: Material, attribute value: Mate-A," the user-designated attribute information extraction processing section 115 adds a result of searching and acquiring attribute information having the high inter-attribute-information association degree with "attribute name: Melting point, attribute value: 500K," "attribute name: density, attribute value: 19 g/cm$^3$" to the associated attribute information table 1262.

Subsequently, in Step S318, the user-designated attribute information extraction processing section 115 assumes sets of values of the attribute name candidate and the attribute value candidate in all records in the associated attribute information table 1262 newly acquired in Step S317 as the user-designated attribute information used in Step S317, searches again attribute information having the high inter-attribute-information association degree similarly to Step S317, and adds a result of acquisition to the associated attribute information table 1262.

In a case in which data is added to the associated attribute information table 1262 in Step S318, or Step S319: NO, the user-designated attribute information extraction processing section 115 returns the process to Step S318. Otherwise, or Step S319: NO, the user-designated attribute information extraction processing section 115 transmits all records in the user-designated attribute information table 1261 and the associated attribute information table 1262 to the associated attribute information extraction program 311 of the client 30 in Step S3110.

On the other hand, the associated attribute information extraction program 311 of the client 30 displays document data, in which the user-designated attribute information is subjected to predetermined highlighting characters through using color, size changing, adding underline or shading, on a user-designated attribute information display section 504 of the attribute information display screen 500 on the basis of contents of the records in the user-designated attribute information table 1261 transmitted from the data management server 10.

In a case of user's selecting attribute information to be displayed on the user-designated attribute information display section 504, the associated attribute information extraction program 311 acquires associated attribute information with the user-selected attribute information from the associated attribute information table 1262 transmitted from the data management server 10, and displays the associated attribute information on an associated attribute information display section 505 graphically.

Alternatively, the inter-attribute-information association degree may be displayed on a graph. Furthermore, a function to allow the user to add or delete associated attribute information may be provided. Moreover, a process for merging a plurality of results and displaying a merger result may be provided in a case in which a plurality of pieces of attribute information matching the user-designated attribute information are found.

Likewise, the associated attribute information extraction program 311 processes the records acquired from the associated attribute information table 1262 transmitted from the data management server 10, and displays the attribute information having the high inter-attribute-information association degree on an associated attribute information list display section 506, and displays sentences around the attribute information displayed on an associated attribute information display section 505 and a document name on an associated attribute information extraction information display section 507.

FIG. 25 depicts an example of the attribute information display screen 500 in the third embodiment. The attribute information display screen 500 is a screen for displaying attribute information associated with user-designated attribute information.

This attribute information display screen 500 includes the extracted attribute list display section 501, the user-designated attribute information input section 502, the search button 503, the user-designated attribute information display section 504, the associated attribute information display section 505, the associated attribute information list display section 506, and the associated attribute information extraction information display section 507.

Among the constituent elements, the extracted attribute list display section 501 is an interface on which the associated attribute information extraction program 311 comprehensively displays the extracted set of the values of the attribute name and the attribute value in each record in the extracted attribute information list table 124 per attribute name.

In addition, the user-designated attribute name input section 502 is a box for inputting the attribute information to be searched by the user, or user-designated attribute information, and the attribute name and the attribute value can be input thereto.

Furthermore, the search button 503 is a button for starting search of the attribute information matching the user input attribute information and the attribute information associated with the user input attribute information.

Moreover, the user-designated attribute information display section 504 is a box for displaying a result of searching the attribute information input by the user to the user-designated attribute name input section 502 using the user-designated attribute information table 1261.

On the attribute information display screen 500 of FIG. the sentences around the location where the attribute information matching the user input attribute information is extracted and the document name are displayed. Furthermore, the attribute information display screen 500 has a box for selecting the attribute information to be displayed when a plurality of pieces of attribute information matching the user-designated attribute information are found.

The associated attribute information display section 505 is a box for displaying the attribute information associated with the user-designated attribute information using the associated attribute information table 1262. On the user-designated attribute information display section 504, the user's selected attribute information is displayed graphically by being connected to pieces of attribute information having high inter-attribute-information association degrees.

The associated attribute information list display section 506 is a box for displaying a list of attribute information associated with the user-designated attribute information. On the associated attribute information list display section 506, a list of attribute information having high inter-attribute-information association degrees is displayed for the attribute information selected by the user on the user-designated attribute information display section 504.

On the associated attribute information extraction information display section 507, the sentences around the location where the attribute information displayed in the associated attribute information list display section 506 is extracted and the document name are displayed for the attribute information.

It is noted that configurations, functions, processing sections, processing means, and the like described above may be realized by hardware by, for example, designing a part or all thereof with integrated circuits.

Moreover, the present invention can be realized by a program code of software that realizes the functions in the embodiments. In this case, a storage medium that records the program code is provided to a computer and a processor included in the computer reads the program code stored in the storage medium. In this case, the program code itself read from the storage medium realizes the functions in the embodiments described above; thus, the program code itself and the storage medium storing the program code configure the present invention.

As the storage medium for supplying such a program code, a flexible disk, a compact disk read only memory (CD-ROM), a digital versatile disk read only memory (DVD-ROM), a hard disk, an solid state drive (SSD), an optical disk, a magneto-optical disk, a compact disk-recordable (CD-R), a magnetic tape, a nonvolatile memory card, or a ROM, for example is used.

Moreover, the program code that realizes the functions described in the present embodiments can be implemented by, for example, a program or a script language in a wide range such as an assembler, C/C++, pert, Shell, PHP, and Java.

Furthermore, by distributing the program code of the software that realizes the functions in the embodiments via a network, the program code may be stored in storage means such as a hard disk or a memory of the computer or a storage medium such as a compact disc-rewritable (CD-RW) or a CD-R, and the processor provided in the computer may read the program code stored in the storage means or the storage medium and execute the program code.

In the embodiments described above, control lines or information lines considered to be necessary for the description are illustrated and all the control lines or the information lines are not always illustrated in terms of a product. All the configurations may be mutually connected.

While the present invention has been specifically described for the best mode and the like for carrying out the present invention, the present invention is not limited thereto and various changes and modifications can be made within the scope of the spirit of the invention.

According to the embodiments described so far, it is possible to accurately and efficiently present user-designated attribute information and other attribute information that may give additional value to the user-designated attribute information among attribute information contained in a document. This can contribute to user's efficiently discovering attribute information for use in analysis from among an enormous amount of attribute information.

At least the following matters are made clear from the description of the present specification. In other words, the attribute extraction apparatus in the present embodiments may be configured such that the computing section calculates an association degree between the pieces of attribute information and the importance degree of each of the attribute information on the basis of a feature of the document structure at a time of calculating the index.

According to this configuration, it is eventually possible to further accurately and further efficiently present the user-designated attribute information and the other attribute information that may give additional value to the attribute information among the attribute information contained in the document. This can contribute to user's further efficiently discovering attribute information for use in analysis from among an enormous amount of attribute information.

Furthermore, the attribute extraction apparatus in the present embodiments may be configured such that the computing section calculates the association degree on the basis of co-occurrency and an appearance distance between the pieces of attribute information.

According to this configuration, it is possible efficiently and accurately identify the inter-attribute-information association degree. It is eventually possible to further accurately and further efficiently present the user-designated attribute information and the other attribute information that may give additional value to the attribute information among the attribute information contained in the document. This can contribute to user's further efficiently discovering attribute information for use in analysis from among an enormous amount of attribute information.

Moreover, the attribute extraction apparatus in the present embodiments may be configured such that the computing section calculates the importance degree on the basis of at least one of an appearance position and an appearance frequency of each of the attribute information in the document, and a position relationship with a preset specific word.

According to this configuration, it is possible efficiently and accurately identify the attribute information importance degree. It is eventually possible to further accurately and further efficiently present the user-designated attribute information and the other attribute information that may give additional value to the attribute information among the attribute information contained in the document. This can contribute to user's further efficiently discovering attribute information for use in analysis from among an enormous amount of attribute information.

Furthermore, the attribute extraction apparatus in the present embodiments may be configured such that the computing section narrows down attribute information for which the importance degree is to be calculated on the basis of the index.

According to this configuration, it is possible to efficiently narrow down appropriate attribute information for which the importance degree is to be calculated, and eventually possible to further accurately and further efficiently present the user-designated attribute information and the other attribute information that may give additional value to the attribute information among the attribute information contained in the document. This can contribute to user's further efficiently discovering attribute information for use in analysis from among an enormous amount of attribute information.

Moreover, the attribute extraction apparatus in the present embodiments may be configured such that the computing section sets user-designated attribute information as the predetermined attribute information, and calculates the importance degree with respect to the relationship between the user-designated attribute information and the attribute information other than the user-designated attribute information.

According to this configuration, it is possible to calculate the importance degree in relation to the attribute information to which the user pays attention. It is eventually possible to further accurately and further efficiently present the user-designated attribute information and the other attribute information that may give additional value to the attribute information among the attribute information contained in the document. This can contribute to user's further efficiently discovering attribute information for use in analysis from among an enormous amount of attribute information.

Furthermore, the attribute extraction apparatus in the present embodiments may be configured such that the computing section eliminates overlaps of same attribute information for which the index is to be calculated in a case in which a predetermined number or more of pieces of the same attribute information are present in the document.

According to this configuration, it is possible to improve efficiency of calculation of the index, and eventually possible to further accurately and further efficiently present the user-designated attribute information and the other attribute information that may give additional value to the attribute information among the attribute information contained in the document. This can contribute to user's further efficiently discovering attribute information for use in analysis from among an enormous amount of attribute information.

What is claimed is:

1. An attribute extraction apparatus comprising:
one or more processors and one or more non-transitory computer-readable storage media, the non-transitory computer-readable storage media having stored thereon at least:
instructions for executing a process for calculating a predetermined index on a basis of a document structure of a document with respect to a relationship between a plurality of pieces of attribute information described in a stored document,
a process for calculating an importance degree of each piece of the attribute information other than predetermined attribute information with respect to predetermined attribute information on a basis of at least one of the index and a predetermined statistical property with respect to a relationship between the predetermined attribute information and the attribute information other than the predetermined attribute information among the plurality of pieces of the attribute information, and extracting portions of the document based on the importance degree of each piece of the attribute information other than predetermined attribute information, wherein calculating the importance degree is made at least on a basis of an absolute appearance position of each piece of the attribute information in the document, and wherein the attribute information comprises an attribute name and an attribute value, and wherein the attribute name and the attribute value are terms in the document.

2. The attribute extraction apparatus according to claim 1, the non-transitory computer-readable storage media having stored thereon instructions for
calculating an association degree between the pieces of attribute information and the importance degree of each piece of the attribute information on a basis of a feature of the document structure at a time of calculating the index.

3. The attribute extraction apparatus according to claim 2, wherein
the non-transitory computer-readable storage media having stored thereon instructions for
calculating the association degree on a basis of co-occurrency and an appearance distance between the pieces of attribute information.

4. The attribute extraction apparatus according to claim 2, the non-transitory computer-readable storage media having stored thereon instructions for
calculating the importance degree on a further basis of at least one of an appearance frequency of each piece of the attribute information in the document, and a position relationship with a preset specific word.

5. The attribute extraction apparatus according to claim 1, the non-transitory computer-readable storage media having stored thereon instructions for
narrowing down attribute information for which the importance degree is to be calculated, on a basis of the index.

6. The attribute extraction apparatus according to claim 1, the non-transitory computer-readable storage media having stored thereon instructions for
setting user-designated attribute information as the predetermined attribute information, and
calculating the importance degree with respect to the relationship between the user-designated attribute information and the attribute information other than the user-designated attribute information.

7. The attribute extraction apparatus according to claim 1, the non-transitory computer-readable storage media having stored thereon instructions for eliminating overlaps of same attribute information for which the index is to be calculated in a case in which a predetermined number or more of pieces of the same attribute information are present in the document.

8. An attribute extraction method comprising:
calculating a predetermined index on a basis of a document structure of a stored document with respect to a relationship between a plurality of pieces of attribute information described in the document;
executing a process for calculating an importance degree of each piece of the attribute information other than predetermined attribute information for the predetermined attribute information on a basis of at least one of the index and a predetermined statistical property with respect to a relationship between the predetermined attribute information and the attribute information other than the predetermined attribute information among the plurality of pieces of the attribute information; and extracting portions of the document based on the importance degree of each piece of the attribute information other than predetermined attribute information, wherein calculating the importance degree is made at least on a basis of an absolute appearance position of each piece of the attribute information in the document, and wherein the attribute information comprises an attribute name and an attribute value, and wherein the attribute name and the attribute value are terms in the document.

9. A non-transitory computer readable storage medium having a computer program recorded thereon an attribute extraction program comprising:

instructions for storing a document, instructions for executing a process for calculating a predetermined index on a basis of a document structure of the document with respect to a relationship between a plurality of pieces of attribute information described in the document; and, instructions for executing a process for calculating an importance degree of each piece of the attribute information other than predetermined attribute information with respect to the predetermined attribute information on a basis of at least one of the index and a predetermined statistical property with respect to a relationship between the predetermined attribute information and the attribute information other than the predetermined attribute information among the plurality of pieces of the attribute information, and instructions for extracting portions of the document based on the importance degree of each piece of the attribute information other than predetermined attribute information, wherein calculating the importance degree is made at least on a basis of an absolute appearance position of each piece of the attribute information in the document, and wherein the attribute information comprises an attribute name and an attribute value, and wherein the attribute name and the attribute value are terms in the document.

* * * * *